(12) United States Patent
Tsukanaka et al.

(10) Patent No.: US 9,419,496 B2
(45) Date of Patent: Aug. 16, 2016

(54) RETURN MECHANISM, ACCELERATION MECHANISM, POWER GENERATOR, TRANSMITTER, AND SWITCHING ARRANGEMENT

(71) Applicant: OMRON Corporation, Kyoto-shi, Kyoto (JP)

(72) Inventors: Yohei Tsukanaka, Shiga (JP); Satoru Nishimaki, Shiga (JP); Makoto Wada, Okayama (JP); Kazuyuki Tsukimori, Okayama (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 0 days.

(21) Appl. No.: 14/423,598

(22) PCT Filed: May 30, 2014

(86) PCT No.: PCT/JP2014/064457
§ 371 (c)(1),
(2) Date: Feb. 24, 2015

(87) PCT Pub. No.: WO2015/037286
PCT Pub. Date: Mar. 19, 2015

(65) Prior Publication Data
US 2016/0028291 A1    Jan. 28, 2016

(30) Foreign Application Priority Data

Sep. 10, 2013  (JP) ................................. 2013-187686

(51) Int. Cl.
*G08C 19/12*    (2006.01)
*H02K 7/18*    (2006.01)
(Continued)

(52) U.S. Cl.
CPC ................ *H02K 7/1876* (2013.01); *G05G 1/00* (2013.01); *G05G 5/05* (2013.01); *H01H 5/02* (2013.01);
(Continued)

(58) Field of Classification Search
CPC . H01H 2235/01; H01H 21/285; H01H 11/00; H01H 35/14; Y10T 29/49105; H02K 35/04; E05Y 2201/21; B25J 5/04; G05B 2219/40119; G01P 15/032
USPC ........................ 340/644; 341/176; 200/47, 46
See application file for complete search history.

(56) References Cited

U.S. PATENT DOCUMENTS 5,423,470 A     6/1995  Kawada
6,394,731 B1 *  5/2002  Konosu ...................... B25J 5/04
                                                          414/5

(Continued)

FOREIGN PATENT DOCUMENTS

DE         1 166 882 B      4/1964
DE    10 2010 028 623 A1    11/2011
(Continued)

OTHER PUBLICATIONS

Extended European Search Report in counterpart European Application No. 14 83 7025.7 issued Aug. 18, 2015 (8 pages).
(Continued)

*Primary Examiner* — Mirza Alam
(74) *Attorney, Agent, or Firm* — Osha Liang LLP

(57) ABSTRACT

A return mechanism is achieved which requires only a small force for operation. In one aspect of the present invention, a return mechanism (10) includes: a first spring (1) that acts between an operating section (11) and a working section (12); and a second spring (2) that acts between the operating section (11) and a base (13). A direction in which the second spring acts when the operating section (11) is in a first position is not parallel to a direction in which the second spring (2) acts when the operating section (11) is in a second position. A component which, of a force of the second spring, acts in a direction of motion of the operating section (11) is smaller when the operating section (11) is in the second position than in the first position.

9 Claims, 22 Drawing Sheets

(51) Int. Cl.
*G05G 5/05* (2006.01)
*H01H 5/06* (2006.01)
*H01H 5/02* (2006.01)
*H01H 5/08* (2006.01)
*H01H 5/14* (2006.01)
*H01H 5/18* (2006.01)
*H01H 13/30* (2006.01)
*H02K 35/06* (2006.01)
*G05G 1/00* (2006.01)
*G05G 1/02* (2006.01)
*H01H 13/28* (2006.01)
*H01H 13/36* (2006.01)
*H01H 19/24* (2006.01)

(52) U.S. Cl.
CPC . *H01H 5/06* (2013.01); *H01H 5/08* (2013.01); *H01H 5/14* (2013.01); *H01H 5/18* (2013.01); *H01H 13/30* (2013.01); *H02K 35/06* (2013.01); *G05G 1/02* (2013.01); *H01H 13/28* (2013.01); *H01H 13/36* (2013.01); *H01H 19/24* (2013.01); *H01H 2239/076* (2013.01); *H02K 7/1861* (2013.01)

(56) References Cited

U.S. PATENT DOCUMENTS 6,580,415 B1 * 6/2003 Kato ................. H01H 35/14
345/156

2011/0285487 A1 * 11/2011 Schmidt ................. H02K 35/04
335/302
2014/0246968 A1 * 9/2014 Geng .................... B64D 11/003
312/319.2
2014/0360849 A1 * 12/2014 Takahashi ................ H01H 3/42
200/47

FOREIGN PATENT DOCUMENTS

| GB | 879.938 A | 10/1961 |
| JP | 55-106928 U | 7/1980 |
| JP | 2-82842 U | 6/1990 |
| JP | 4-69828 U | 6/1992 |
| JP | 7-61431 A | 3/1995 |
| WO | 2013/105278 A1 | 7/2013 |

OTHER PUBLICATIONS

International Search Report issued in PCT/JP2014/064457 mailed on Jun. 24, 2014 (1 page).

Written Opinion of the International Searching Authority issued in PCT/JP2014/064457 mailed on Jun. 24, 2014 (4 pages).

Decision to Grant a Patent issued in JP2014-540674 mailed on Dec. 9, 2014 (1 page).

English Translation of Written Opinion of the International Searching Authority issued in PCT/JP2014/064457 mailed on Mar. 31, 2015 (7 pages).

* cited by examiner

RETURN MECHANISM, ACCELERATION MECHANISM, POWER GENERATOR, TRANSMITTER, AND SWITCHING ARRANGEMENT

TECHNICAL FIELD

The present invention relates to a return mechanism, an acceleration mechanism, a power generator including a return mechanism, a transmitter including a return mechanism, and a switching arrangement including a return mechanism.

BACKGROUND ART

A return mechanism for an operating section such as a switch is required to cause the operating section to surely return to its position. At the same time, the return mechanism is required to cause the operating section to be operable with a smaller force.

Patent Literature 1 discloses a locking piece installation device that applies a force to an operating lever by using a combined spring mechanism constituted by two springs. The combined spring mechanism causes the operating lever to return.

Patent Literature 2 discloses an electromagnetic energy transducer including a magnet, a coil, a movable part, and a spring and configured to convert mechanical energy of the movable part into electrical energy. The spring is connected to the movable part. The spring applies a force to the movable part so as to cause the movable part to return to a predetermined position.

For example, in a power generator in which electrical power is generated by electromagnetic induction caused by displacement of a working section, the faster the working section is displaced, the higher power generation efficiency becomes. In a case where a return mechanism is used to cause the working section to return by itself in such a power generator, it is necessary that the force required for operation be small and that the working section be displaced at a high speed in response to the operation.

Further, in cases other than that of a power generator, it may be necessary that that the force required for operation be small and that the working section be displaced at a high speed in response to the operation.

CITATION LIST

Patent Literature 1
Japanese Patent Application Publication, Tokukaihei, No. 7-61431 A (Publication Date: Mar. 7, 1995)
Patent Literature 2
United States Patent Application Publication No. 2011/0285487 A1 (Publication Date: Nov. 24, 2011)

SUMMARY OF INVENTION

Technical Problem

In the configuration of Patent Literature 1, the positional relationship between the working section, which exerts action, and the operating section, which a user operates, is definite. This makes it impossible to displace the working section at a high speed in response to operation.

In the configuration of Patent Literature 2, the spring, which is for use in return, is directly connected to the movable part, which exerts action. This requires a larger force to operate the movable part. This also makes it impossible to displace the movable part at a high speed in response to operation.

It is an object of an aspect of the present invention to achieve a return mechanism that requires only a small force for operation and that enables a working section to be displaced at a high speed in response to operation.

Solution to Problem

According to the present invention, a return mechanism for an operating section and a working section includes: the operating section; the working section; a base; a first spring that acts between the operating section and the working section; and a second spring that acts between the operating section and the base, the operating section being moved from a first position to a second position by an external force and being moved from the second position to the first position by a force that is applied from the second spring, the working section being moved between a third position and a fourth position in response to a motion of the operating section between the first position and the second position, the first spring causing the working section to be moved by elastic energy stored by at least either an external force that is applied to the operating section or the force that is applied from the second spring, the second spring causing the operating section to be returned to the first position by elastic energy stored by the external force that is applied to the operating section, in a case where the working section is in at least either the third position or the fourth position, a retention force that causes the working section to be retained in that position acting on the working section, a direction in which the force of the second spring is applied to the operating section when the operating section is in the first position being not parallel to a direction in which the force of the second spring is applied to the operating section when the operating section is in the second position, a component which, of the force of the second spring, acts in a direction of motion of the operating section being smaller when the operating section is in the second position than in the first position, assuming that a direction of return of the operating section is positive.

According to the present invention, an acceleration mechanism for a working section, the acceleration mechanism comprising: an operating section; the working section; a base; a first spring that acts between the operating section and the working section; and a third spring that acts between the working section and the base, the operating section being moved from a first position to a second position by an external force, the working section being moved between a third position and a fourth position in response to a motion of the operating section between the first position and the second position, the first spring causing the working section to be moved by elastic energy stored by an external force that is applied to the operating section, in a case where the working section is in at least either the third position or the fourth position, a retention force that causes the working section to be retained in that position acting on the working section, a direction in which the force of the third spring is applied to the working section when the working section is in the third position being not parallel to a direction in which the force of the third spring is applied to the working section when the working section is in the fourth position, a component which, of the force of the third spring, acts in a direction of motion of the working section being smaller when the working section is in the fourth position than in the third position, assuming that a direction of return of the working section from the fourth position to the third position is positive.

Advantageous Effects of Invention

The present invention makes it possible to cause the working section to move at a high speed regardless of the speed of operation, and also makes it possible to lower the maximum value of an external force that is required for operation of the operating section.

DESCRIPTION OF EMBODIMENTS

In each of the sections, for convenience of explanation, members having the same functions as those described in the preceding section(s) are given the same reference signs, and as such, are omitted from the description as needed. First, a reference example of a return mechanism is described.

Reference Example 1

Figure 19:
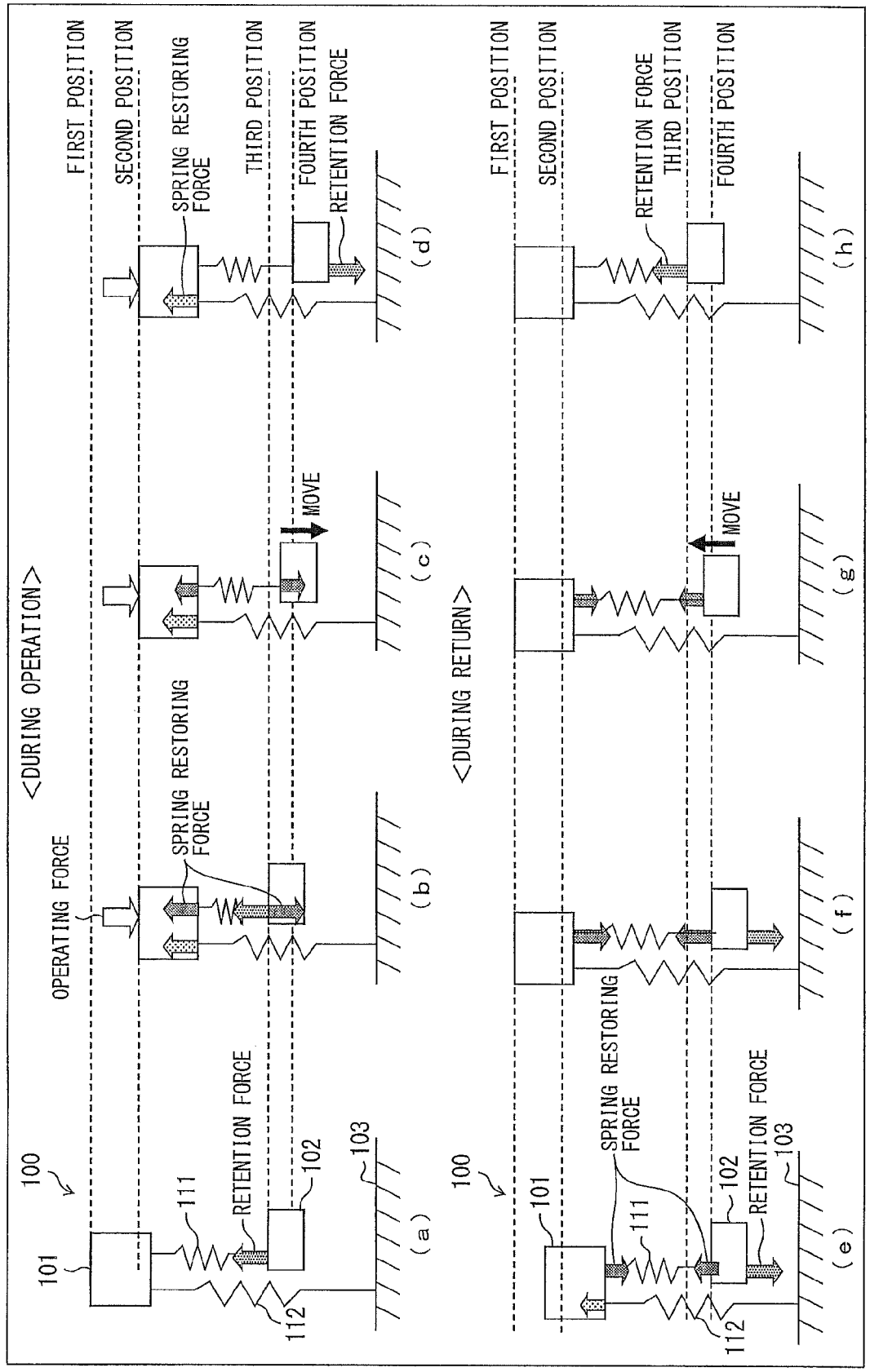
FIG. 19 is a diagram showing operation and return action of a return mechanism of Reference Example 1.

FIG. 19 is a diagram showing operation and return action of a return mechanism 100 of Reference Example 1. The return mechanism 100 includes an operating section 101, a working section 102, a base 103, an accelerating spring 111, and a returning spring 112. The accelerating spring 111 connects the operating section 101 and the working section 102 to each other. The returning spring 112 connects the operating section 101 and the base 103 to each other. A direction of action of the returning spring 112 on the operating section 101 is parallel to a direction of action of the accelerating spring 111 on the operating section 101.

The operating section 101 can be displaced between a first position and a second position. The working section 102 can be displaced between a third position and a fourth position. The base 103 is fixed. A direction along which the operating section 101 can be displaced, a direction along which the working section 102 can be displaced, the direction of action of the returning spring 112, and the direction of action of the accelerating spring 111 are parallel to one another.

When the working section 102 is in the third position, a retention force is acting on the working section 102 so as to retain the working section 102 in the third position. When the working section 102 is in the fourth position, a retention force is acting on the working section 102 so as to retain the working section 102 in the fourth position.

(a) of FIG. 19 shows an initial state of the return mechanism 100. The initial state is a state in which no external force is being applied to the operating section 101. In the initial state, the working section 102 is retained in the third position by a retention force. Further, in the initial state, the operating section 101 is pressed into the first position by a restoring force of the returning spring 112 having been compressed.

(b) of FIG. 19 shows a state in which the application of an operating force to the operating section 101 has caused the operating section 101 to be displaced. Application of the operating force to the operating section 101 as an external force causes the operating section 101 to be displaced from the first position to the second position. In response to the displacement of the operating section 101, the returning spring 112 and the accelerating spring 111 are compressed.

When a restoring force of the accelerating spring 111 having been compressed becomes larger than the retention force acting on the working section 102, the restoring force of the accelerating spring 111 having been compressed causes the working section 102 to be displaced from the third position to the fourth position (see (c) of FIG. 19). The working section 102, which has been displaced to the fourth position, is kept retained in the fourth position by a retention force (see (d) of FIG. 19). Thus, the action of the operating section 101 and the working section 102 during operation is completed.

The working section 102 is moved by the accelerating spring 111 when the restoring force of the accelerating spring 111 having been compressed exceeds the retention force and the stored elastic energy is released. That is, the working section 102 is moved at a high speed by the accelerating spring 111 regardless of the velocity of motion of the operating section 101.

When no operating force acts on the operating section 101 any longer, the restoring force of the returning spring 112 having been compressed causes the operating section 101 to start to move from the second position to the first position (see (e) of FIG. 19). At this point in time, the working section 102 is kept retained in the fourth position by the retention force. Therefore, in response to the displacement of the operating section 101, the accelerating spring 111 is elongated to be longer than its natural length (see (e) and (f) of FIG. 19). The operating section 101 is displaced to the first position.

When a restoring force of the accelerating spring 111 having been elongated becomes larger than the retention force acting on the working section 102, the restoring force of the accelerating spring 111 having been elongated causes the working section 102 to be displaced from the fourth position to the third position (see (g) of FIG. 19). The working section 102, which has been displaced to the third position, is kept retained in the third position by a retention force (see (h) of FIG. 19). Thus, the action of the operating section 101 and the working section 102 during return is completed.

The working section 102 is moved by the accelerating spring 111 when the restoring force of the accelerating spring 111 having been elongated exceeds the retention force and the stored elastic energy is released. That is, the working section 102 is moved at a high speed by the accelerating spring 111 regardless of the velocity of motion of the operating section 101 that returns.

As just described, the returning spring 112, the accelerating spring 111, and the retention force acting on the working section 102 enable the working section 102 to be moved at a high speed by the accelerating spring 111 regardless of the velocity of motion of the operating section 101.

(FS Characteristic)

Figure 20:
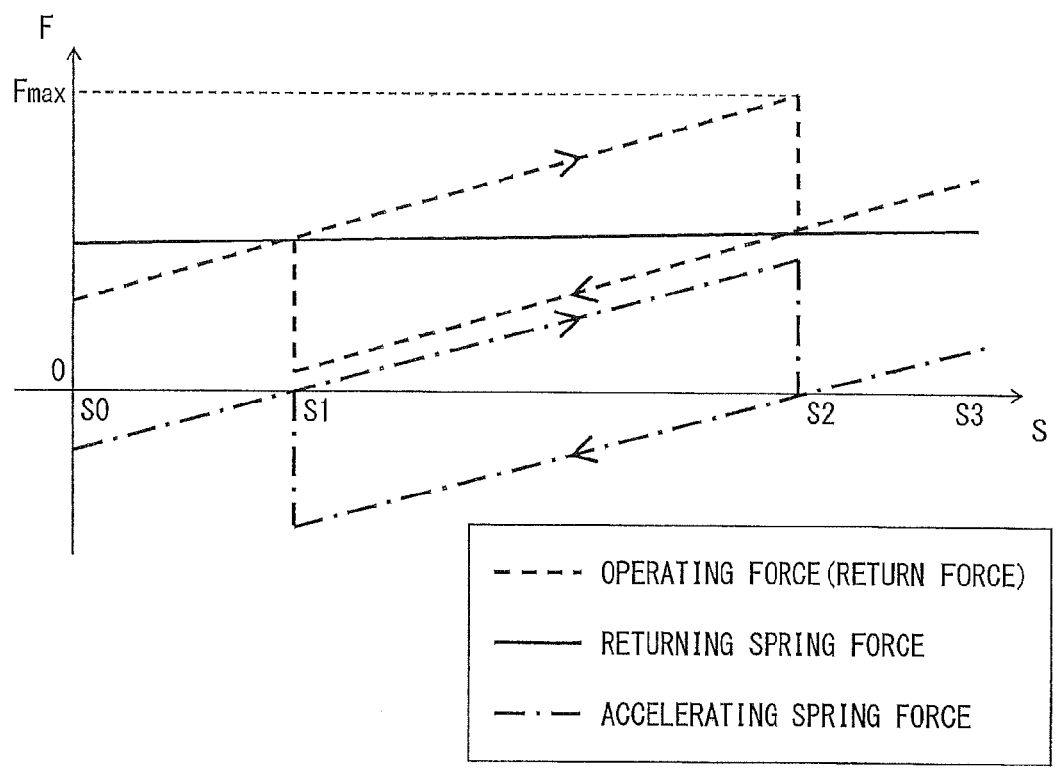
FIG. 20 is a diagram showing an FS characteristic of the return mechanism of Reference Example 1.

FIG. 20 is a diagram showing an FS characteristic of the return mechanism 100 of Reference Example 1. The horizontal axis represents S (stroke) of the operating section 101, and the vertical axis represents F (force). FIG. 20 shows the force of the accelerating spring 111 (restoring force), the force of the returning spring 112, and the operating force. The operating force is a force that is required for the user to operate the operating section 101. The operating force that is required for operation at each stroke position is the resultant of the returning spring force and the accelerating spring force. A positive force indicates that an upward force is being applied to the operating section 101 (in the direction from the second position to the first position). The operating force required can also be said to be an upward force (return force) with which the operating section 101 returns.

Each of the springs has a force of 0 at its natural length. Note here that the force of the returning spring 112 is constant. This is based on an ideal situation in which the returning spring 112 has a small spring constant and is greatly compressed in advance in the initial position. In reality, the force of the returning spring 112 linearly increases with an increase in stroke. Throughout the whole stroke, the returning spring 112 is compressed to be shorter than its natural length. When the force of the accelerating spring 111 is negative, the accelerating spring 111 is elongated to be longer than its natural length. When the force of the accelerating spring 111 is positive, the accelerating spring 111 is compressed to be shorter than its natural length.

The initial state shown in (a) of FIG. 19 corresponds, for example, to the time when the operating section 101 is positioned at the stroke S0. The state shown in (d) of FIG. 19 corresponds, for example, to the time when the operating section 101 is positioned at the stroke S3. Note, however, that the first position of the operating section 101 may vary between the stroke S0 and the stroke S1 and that the second position of the operating section 101 may vary between the stroke S2 and the stroke S3.

(During Operation)

Displacement of the operating section 101 from the first position (S0) by the application of an operating force to the operating section 101 causes the accelerating spring 111 to become compressed, so that its restoring force (spring force) linearly increases. That is, the operating force that is required for operation increases, too. Note that even after the operating section 101 goes beyond the stroke S1, the accelerating spring 111 continues to be compressed, as the working section 102 is retained in the third position by a retention force.

When the operating section 101 has reached the stroke S2, the restoring force of the accelerating spring 111 having been compressed exceeds the retention force by which the working section 102 is retained in the third position. Therefore, at the stroke S2, the working section 102 is displaced from the third position to the fourth position. Along with this displacement, the accelerating spring 111, which has been compressed, is released, and the accelerating spring 111 returns substantially to its natural length. At the same time, the operating force lowers, too.

A further increase in stroke of the operating section 101 from the stroke S2 causes the accelerating spring 111 to be compressed again, so that the restoring force and the operating force increase.

(During Return)

On the other hand, when a weaker external force (operating force) is applied to the operating section 101, the resultant (return force) of the returning spring force and the accelerating spring force causes the operating section 101 to return. The return of the operating section 101 in the direction from the second position (S3) to the first position causes the accelerating spring 111 to become less compressed, so that its restoring force (spring force) linearly decreases. That is, the operating force (return force) decreases, too. Even after the operating section 101 returns beyond the stroke S2, the accelerating spring 111 is elongated, as the working section 102 is retained in the fourth position by a retention force.

When the operating section 101 has reached the stroke S1, the restoring force of the accelerating spring 111 having been elongated exceeds the retention force by which the working section 102 is retained in the fourth position. Therefore, at the stroke S1, the working section 102 is displaced from the fourth position to the third position. Along with this displacement, the accelerating spring 111, which has been elongated, is released, and the accelerating spring 111 returns substantially to its natural length. At the same time, the return force increases.

A further decrease in stroke of the operating section 101 from the stroke S1 causes the accelerating spring 111 to be elongated again, so that the restoring force and the operating force decrease.

In this manner, the return force that is applied to the operating section 101 (i.e. the operating force that is required for operation) exhibits hysteresis. In order for the return action not to be interrupted, it is necessary that the return force be always positive. For that purpose, the spring force of the returning spring 112 is set so that the return force is positive even in a state (S1) in which the accelerating spring 111 is elongated to its fullest extent. That is, at the stroke S1, the spring force of the returning spring 112 must be larger than the retention force acting on the working section 102 in the fourth position.

The maximum operating force Fmax that is required for operation is a value that is achieved when the operating section 101 reaches the stroke S2 during operation. In reality, the maximum operating force Fmax can be even larger, as the restoring force of the returning spring 112 linearly increases with an increase in stroke. This means that the user must apply a large operating force to the operating section 101.

Embodiment 1

An embodiment of the present invention is described below. The present embodiment differs from Reference Example 1 in terms of the configuration of a spring corresponding to the returning spring.

(Configuration of a Return Mechanism 10)

Figure 1:
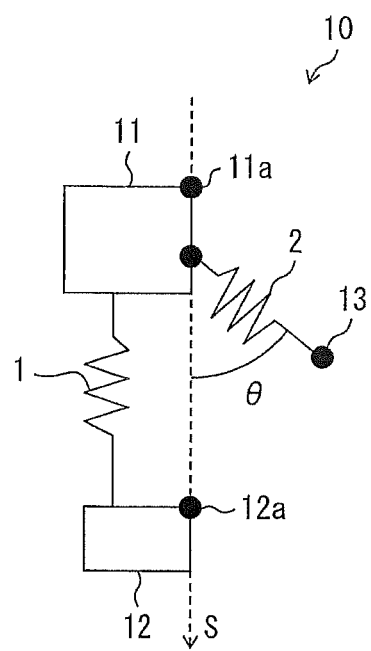
FIG. 1 is a diagram schematically showing a configuration of a return mechanism according to an embodiment of the present invention.

FIG. 1 is a diagram schematically showing a configuration of a return mechanism 10 of the present embodiment. The present embodiment is directed to a return mechanism that requires only a small operating force, the return mechanism including an operating section 11 configured to return by itself and a working section 12 configured to return by itself and to move at a high speed regardless of the speed of operation. A high-speed motion of the working section 12 can be achieved by a first spring 1 and a retention force acting on the working section 12. Further, a second spring 2 allows the operating section 11 and the working section 12 to return by themselves. In the present embodiment, by devising the configuration (arrangement) of the second spring 2, the operating force required is made lower than that required by the return mechanism of Reference Example 1.

The return mechanism 10 includes the operating section 11, the working section 12, a base 13, the first spring 1, and the second spring 2. The first spring 1 connects the operating section 11 and the working section 12 to each other. The second spring 2 connects the operating section 11 and the base 13 to each other. The base 13 is fixed. The operating section 11 and the working section 12 are movable along a stroke axis S. A direction of application of a force to the operating section 11 by the first spring 1 is parallel to a direction along which the operating section 11 is movable.

Meanwhile, a direction of application of a force to the operating section 11 by the second spring 2 is at an oblique angle to the direction along which the operating section 11 is movable. Let it be assumed that θ is the angle between the direction of application of a force to the operating section 11 by the second spring 2 and the stroke axis S. The second spring 2 has a first end connected to the base 13, and the first end does not move. On the other hand, the second spring 2 has a second end connected to the operating section 11, and the second end moves as the operating section 11 moves. Therefore, when the operating section 11 moves along the stroke axis S, the angle θ changes accordingly.

Let it be assumed that an operating point 11a on the operating section 11 is a reference for displacement of the operating section 11. When the operating section 11 is translated by an external force, any point on the operating section 11 is translated in the same way. In the case of translation, the operating point 11a may be any point on the operating section 11. Similarly, let it be assumed that any working point 12a on the working section 12 that is translated is a reference for displacement of the working section 12.

The operating point 11a of the operating section 11 can be displaced between a first position and a second position along the stroke axis S. The working point 12a of the working section 12 can be displaced between a third position and a fourth position along the stroke axis S.

When the working point 12a is in the third position, a retention force is acting on the working section 12 so as to retain the working point 12a in the third position. When the working point 12a is in the fourth position, a retention force is acting on the working section 12 so as to retain the working point 12a in the fourth position. Specifically, the working section 12 is retained in the third position by a magnetic force acting thereon when it is in the third position, and the working section 12 is retained in the fourth position by a magnetic force acting thereon when it is in the fourth position.

In the following, for descriptive purposes, the expression "the operating section 11 is in the first position" may be used when the operating point 11a is in the first position, for example. The same applies to the working point 12a and the working section 12.

(Workings of the Return Mechanism 10)

Figure 2:
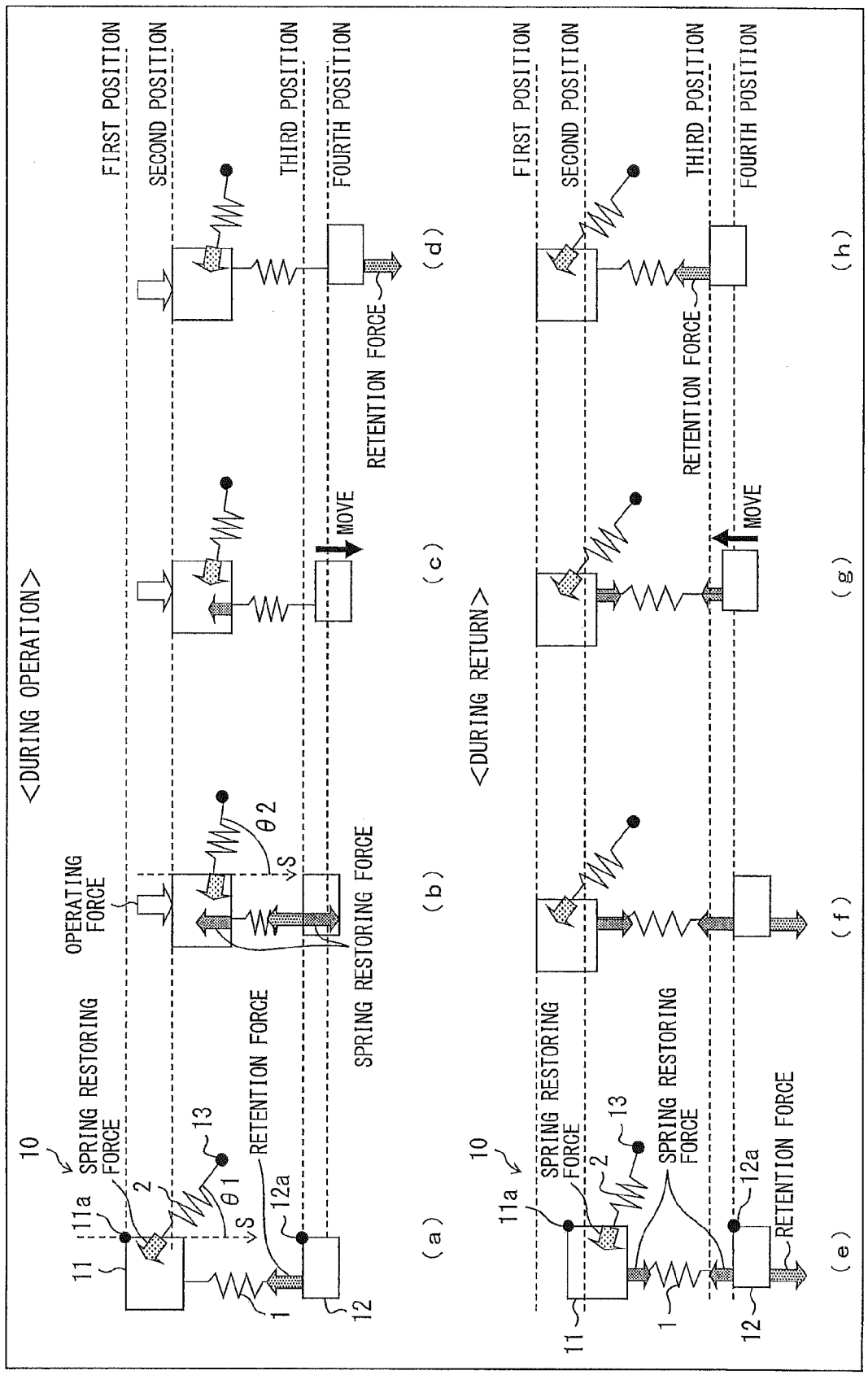
FIG. 2 is a diagram schematically showing operation and return action of the return mechanism.

FIG. 2 is a diagram schematically showing operation and return action of the return mechanism 10 of the present embodiment. A user makes a motion (movement) of the operating section 11 by applying an operating force to the operating section 11 as an external force. Then, in response to the displacement of the operating section 11, the working section 12 is displaced. A movement of the working section 12 allows the return mechanism 10 to provide a function. For example, as will be described below, in a case where the return mechanism 10 is applied to a power generator, electricity is generated by a motion (movement) of the working section 12.

(a) of FIG. 2 shows an initial state of the return mechanism 10. The initial state is a state in which no external force is being applied to the operating section 11. In the initial state, the working section 12 is retained in the third position by a retention force. Further, in the initial state, the operating point 11a is pressed into the first position by a restoring force of the second spring 2 having been compressed. Let it be assumed that θ1 is the angle θ that is formed when the operating point 11a is in the first position. The angle θ is an angle between a direction in which the operating section 11 (operating point 11a) returns and a direction of application of a restoring force of the second spring 2 to the operating section 11. When the operating point 11a is in the first position, a component, along the stroke axis S, of the resorting force of the second spring acting on the operating section 11 (i.e. a component that acts in a direction of motion of the operating section 11) is cos θ1. Let it be assumed that a force acting upward on the operating section 11 (i.e. a force acting in the direction of return of the operating section 11) is positive.

(b) of FIG. 2 shows a state in which the application of an operating force to the operating section 11 has caused the operating section 11 to be displaced. Application of the operating force to the operating section 11 as an external force causes the operating point 11a of the operating section 11 to be displaced from the first position to the second position. In response to the displacement of the operating point 11a, the second spring 2 and the first spring 1 are compressed. Further, since the second spring 2 changes its orientation in response to the displacement of the operating point 11a, the direction of action of the restoring force of the second spring 2 changes, too. A direction in which a force of the second spring 2 is applied to the operating section 11 when the operating point 11a is in the first position is not parallel to a direction in which a force of the second spring 2 is applied to the operating section 11 when the operating point 11a is in the second position.

Let it be assumed that θ2 is the angle θ that is formed when the operating point 11a is in the second position. When the operating point 11a is in the second position, the component, along the stroke axis S, of the restoring force of the second spring 2 acting on the operating section 11 is cos θ2. 0°<θ1<θ2<180°, and cos θ1>cos θ2. That is, the component, along the stroke axis S, of the restoring force of the second spring 2 acting on the operating section 11 (i.e. the component in which the direction in which the operating section 11 returns is positive) is smaller when the operating point 11a is in the second position than in the first position. Therefore, when the user operates the operating section 11, a repulsive force by the second spring 2 becomes gradually smaller. This means that the return mechanism 10 requires less operating force for operation than that of Reference Example 1.

When a restoring force of the first spring 1 having been compressed becomes larger than the retention force acting on the working section 12, the restoring force of the first spring 1 having been compressed causes the working point 12a of the working section 12 to be displaced from the third position to the fourth position (see (c) of FIG. 2). The working section 12, which has been displaced to the fourth position, is kept retained in the fourth position by a retention force (see (d) of FIG. 2). Thus, the action of the operating section 11 and the working section 12 during operation is completed.

The working section 12 is moved by the first spring 1 when the restoring force of the first spring 1 having been compressed exceeds the retention force and the stored elastic energy is released. That is, the working section 12 is moved at a high speed by the first spring 1 regardless of the velocity of motion of the operating section 11.

When no operating force acts on the operating section 11 any longer, the restoring force of the second spring 2 having been compressed causes the operating section 11 to start to move from the second position to the first position (see (e) of FIG. 2). At this point in time, the working section 12 is kept retained in the fourth position by the retention force. Therefore, in response to the displacement of the operating section 11, the first spring 1 is elongated to be longer than its natural length (see (e) and (f) of FIG. 2). The operating section 11 moves to the first position.

When a restoring force of the first spring 1 having been elongated becomes larger than the retention force acting on the working section 12, the restoring force of the first spring 1 having been elongated causes the working section 12 to be displaced from the fourth position to the third position (see (g) of FIG. 2). The working section 12, which has moved to the third position, is kept retained in the third position by a retention force (see (h) of FIG. 2). Thus, the action of the operating section 11 and the working section 12 during return is completed.

The working section 12 is moved by the first spring 1 when the restoring force of the first spring 1 having been elongated exceeds the retention force and the stored elastic energy is released. That is, the working section 12 is moved at a high speed by the first spring 1 regardless of the velocity of motion of the operating section 11 that returns.

As just described, the second spring 2, the first spring 1, and the retention force acting on the working section 12 enable the working section 12 to be moved at a high speed by the first spring 1 regardless of the velocity of motion of the operating section 11.

(FS Characteristic)

Figure 3:
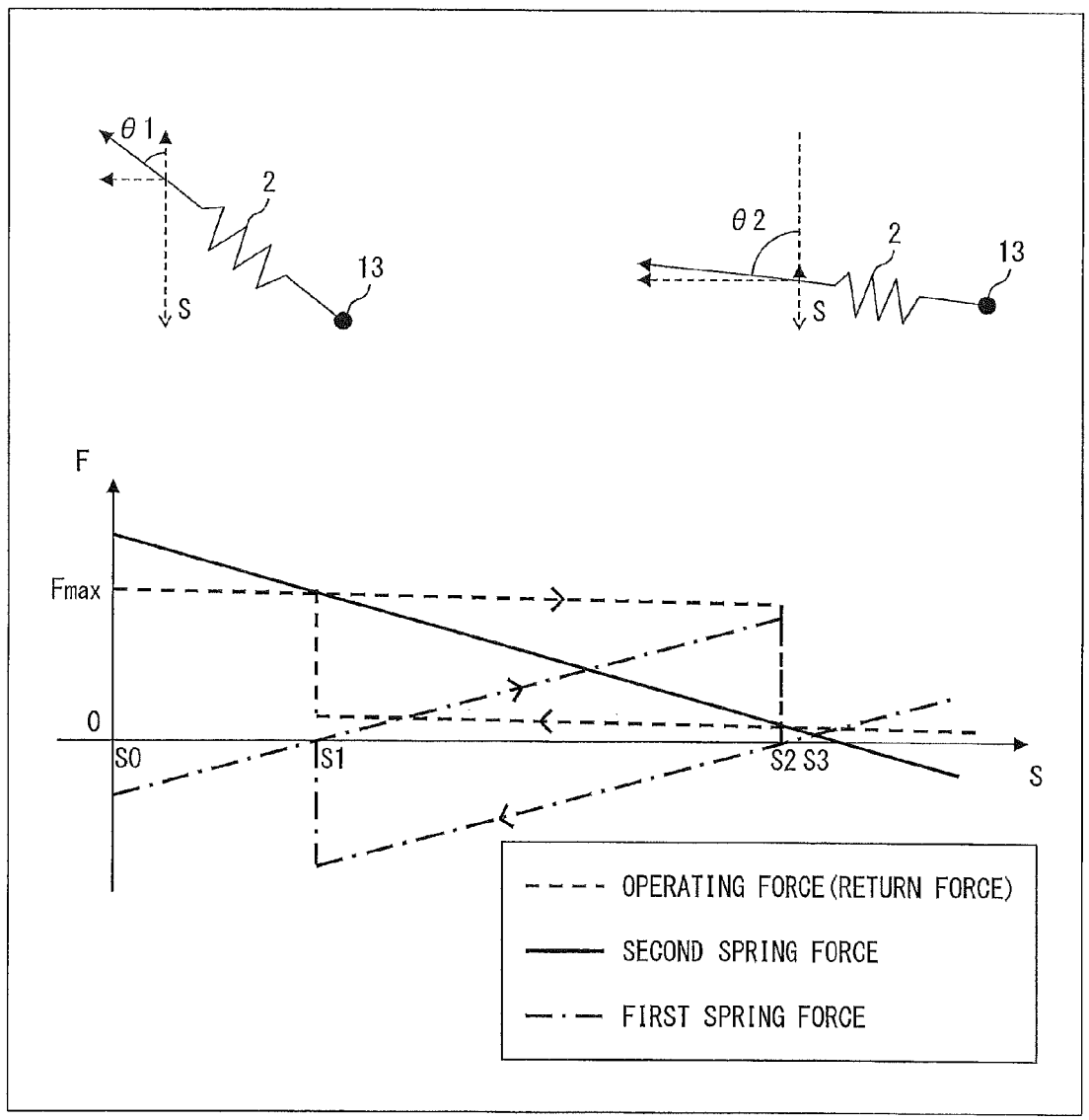
FIG. 3 is a diagram showing an FS characteristic of the return mechanism.

FIG. 3 is a diagram showing an FS characteristic of the return mechanism 10 of the present embodiment. The horizontal axis represents S (stroke) of the operating section 11, and the vertical axis represents F (force). FIG. 3 shows the force of the first spring 1 (first spring force), the force of the second spring 2 (second spring force), and the operating force. The operating force that is required for operation at each stroke position is the resultant of the first spring force and the second spring force. A positive force indicates that an upward force is being applied to the operating section 11 (in the direction from the second position to the first position). Note that the second spring force illustrated is a component, along the stroke axis S, of the force acting on the operating section 11. The component along the stroke axis S is one obtained by multiplying the restoring force of the second spring 2 by cos θ.

In FIG. 3, a state of the second spring 2 in the first position and a state of the second spring 2 in the second position are shown at the upper left and the upper right in FIG. 3, respectively.

The second spring 2 is compressed with an increase in stroke. Nevertheless, the second spring force monotonically decreases with an increase in stroke. This is because the angle θ increases and cos θ becomes smaller. For example, when θ=90°, cos θ=0; therefore, the second spring force, which is the component along the stroke axis S, becomes 0, too. Note that throughout the whole stroke, the second spring 2 is compressed to be shorter than its natural length. When elongated to be longer than its natural length. When the first spring force is positive, the first spring 1 is compressed to be shorter than its natural length.

The initial state shown in (a) of FIG. 2 (i.e. the top dead center of the operating section 11) corresponds, for example, to the time when the operating section 11 is positioned at the stroke S0. The state shown in (d) of FIG. 2 (i.e. the bottom dead center of the operating section 11) corresponds, for example, to the time when the operating section 11 is positioned at the stroke S3. Note, however, that the first position of the operating section 11 may vary between the top dead center (S0) of the operating section 11 and the stroke S1 and that the second position of the operating section 11 may vary between the stroke S2 and the bottom dead center (S3) of the operating section 11.

(During Operation)

Displacement of the operating section 11 from the first position (S0) by the application of an operating force to the operating section 11 causes the first spring 1 to become compressed, so that the first spring force linearly increases. Meanwhile, since the angle θ of the second spring 2 with respect to the stroke axis becomes larger, the second spring force decreases. Therefore, the operating force that is required for operation is substantially constant. Depending on the degree of decrease in the second spring force, the operating force can increase or decrease instead of being constant. Note that even after the operating section 11 goes beyond the stroke S1, the first spring 1 continues to be compressed, as the working section 12 is retained in the third position by a retention force.

When the operating section 11 has reached the stroke S2, the restoring force of the first spring 1 having been compressed exceeds the retention force by which the working section 12 is retained in the third position. Therefore, at the stroke S2, the working section 12 is displaced from the third position to the fourth position. Along with this displacement, the first spring 1, which has been compressed, is released, and the first spring 1 returns substantially to its natural length. At the same time, the operating force lowers, too.

A further increase in stroke of the operating section 11 from the stroke S2 causes the first spring 1 to be compressed again, so that the first spring force increases. Meanwhile, since the second spring force decreases, the operating force is kept low and shows little change.

Note that when the second spring force is negative, it means that the angle θ exceeds 90°. Even when the angle θ exceeds 90° and the force by the second spring 2 is applied downward to the operating section 11, an upward force of the first spring 1 increases in such a manner as to cancel it out. Hence, the total return force is positive (acts upward). Therefore, the operating section 11 returns even when the angle θ exceeds 90° in the second position, provided the return force is positive.

(During Return)

On the other hand, when a weaker external force (operating force) is applied to the operating section 11, the resultant (return force) of the first spring force and the second spring force causes the operating section 11 to return. The return of the operating section 11 in the direction from the second position (S3) to the first position causes the first spring 1 to become less compressed. Meanwhile, the second spring force increases. The operating force is kept low and shows little change. Even after the operating section 11 returns beyond the stroke S2, the first spring 1 is elongated, as the working section 12 is retained in the fourth position by a retention force.

When the operating section 11 has reached the stroke S1, the restoring force of the first spring 1 having been elongated exceeds the retention force by which the working section 12 is retained in the fourth position. Therefore, at the stroke S1, the working section 12 is displaced from the fourth position to the third position. Along with this displacement, the first spring 1, which has been elongated, is released, and the first spring 1 returns substantially to its natural length. At the same time, the return force increases.

A further decrease in stroke of the operating section 11 from the stroke S1 causes the first spring 1 to be elongated again. Meanwhile, since the second spring force increases, the return force is kept high and shows little change.

In this manner, the return force that is applied to the operating section 11 (i.e. the operating force that is required for operation) exhibits hysteresis. In order for the return action not to be interrupted, it is necessary that the return force be always positive. For that purpose, the spring force of the second spring 2 is set so that the return force is positive even in a state (S1) in which the first spring 1 is elongated to its fullest extent. That is, at the stroke S1, the second spring force must be larger than the retention force acting on the working section 12 in the fourth position.

(Effects of the Return Mechanism 10)

The maximum operating force Fmax that is required for operation is a value that varies between the stroke S0 and the stroke S2 during operation. When the operating force is constant from the stroke S0 to the stroke S2, Fmax needs only be larger than the retention force actin on the working section 12 in the fourth position. Therefore, the return mechanism 10 of the present embodiment allows the user to operate the operating section 11 with a smaller operating force than that of Reference Example 1. Further, the working section 12 can be moved at a high speed by the elastic energy stored in the first spring 1. This makes it possible to reduce the burden of operation without increasing a stroke amount of the operating section and improve operability.

Further, by adjusting the slope of the second spring force in the FS characteristic, the gradient of the operating force can be adjusted as needed. That is, operability can be improved. The slope of the second spring force in the FS characteristic depends on the slope of the second spring 2 with respect to the stroke axis S, the degree of compression of the second spring 2, the spring constant of the second spring 2, etc.

Note that the connection of the second spring 2 to the operating section 11 and the base 13 does not need to be fixed. The second spring 2 needs only be placed between the operating section 11 and the base 13 so as to apply a repulsive force to each of them. Further, the operating section 11 and the working section 12 may each be constituted by a plurality of components. It is important that the forces of the first spring 1 and the second spring 2 act as shown in FIG. 2. The base 13 does not need to be fixed, provided it regulates change of position of the first end of the second spring 2.

Alternatively, the return mechanism may be configured such that the first spring is elongated during operation and the first spring is compressed during return. For example, the working section 12 and the first spring may be placed on a side of the operating section 11 opposite to those shown in FIG. 1. In this case, the first spring is elongated as the operating section 11 is displaced downward (i.e. toward the second position). The working section 12 is displaced downward (i.e. toward the fourth position) by the first spring having been elongated.

(Specific Example of an FS Characteristic)

Figure 4:
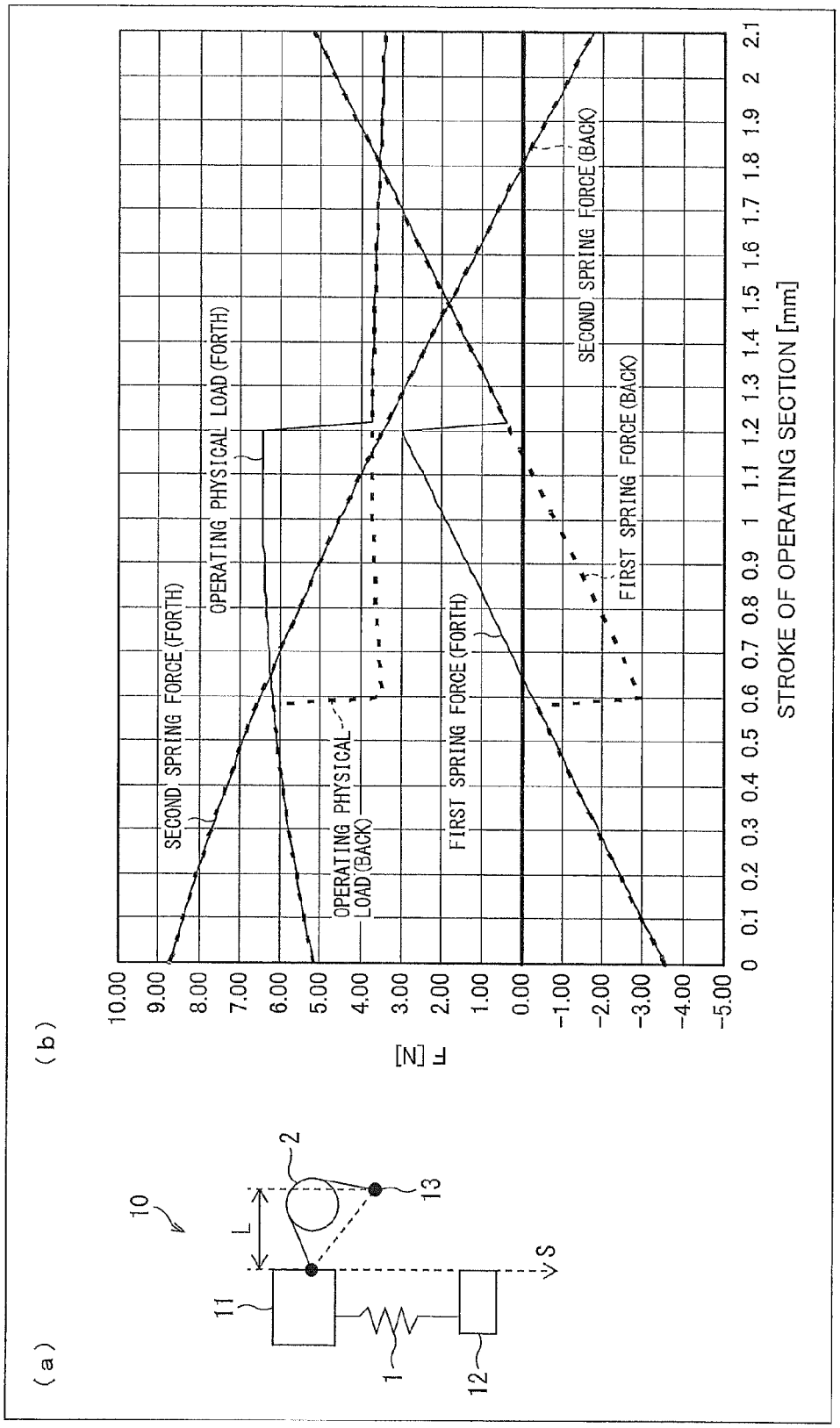
FIG. 4 is a diagram showing a specific example of an FS characteristic of the return mechanism.

FIG. 4 is a diagram showing a specific example of an FS characteristic of the return mechanism 10. (a) of FIG. 4 shows a configuration of the return mechanism 10, and (b) of FIG. 4 shows a specific example of an FS characteristic. In (b) of FIG. 4, the horizontal axis represents the stroke of the operating section 11, and the vertical axis represents force. In (b) of FIG. 4, the first spring force, the second spring force, and the operating load (operating force) during both operation (forth) and return (back) are shown.

Let it be assumed here the first spring 1 is a coil spring having a natural length of 9.36 [mm] and a spring constant of 5.45 [N/mm]. The second spring 2 is a torsion spring having a free angle of 1.46 [rad], a spring constant of 192 [N·mm/rad], and an arm length of 6 [mm]. The distance L between the first and second ends of the second spring 2 along a direction perpendicular to the stroke axis S is 4 [mm]. The retention force by which the working section 12 is retained in the third position and the retention force by which the working section 12 is retained in the fourth position are each 3 [N]. The stroke of the working section 12 is 0.6 [mm].

Since an increase in the first spring force and a decrease in the second spring force cancel each other out while the stroke varies from 0 mm to 1.2 mm, an increase in the operating load is kept to a low level.

(Specific Examples of Retention Forces)

Figure 5:
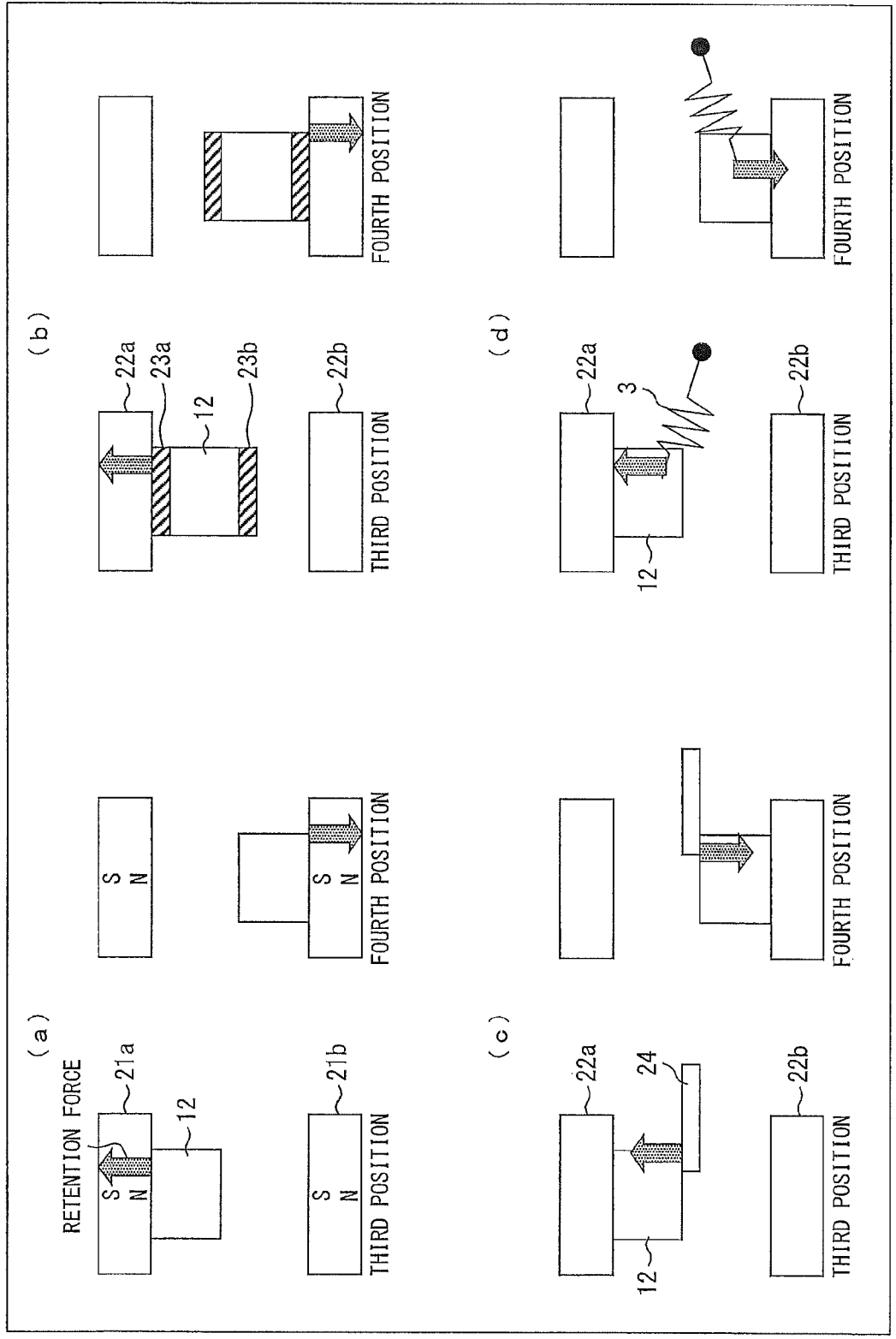
FIG. 5 is a diagram showing specific examples of retention forces.

FIG. 5 is a diagram showing specific examples of retention forces. (a) of FIG. 5 shows a case where a magnetic force is used as a retention force. The return mechanism includes two magnets 21a and 21b opposed to each other with the working section 12 interposed therebetween. In this case, the working section 12 is a ferromagnetic body. When in the third position, the working section 12 is retained in the third position by a magnetic force of the upper magnet 21a, and when in the fourth position, the working section 12 is retained in the fourth position by a magnetic force of the lower magnet 21b. Note that the magnets 21a and 21b may be connected to each other at a point (not illustrated).

(b) of FIG. 5 shows a case where an adhesive force is used as a retention force. The return mechanism includes two supports 22a and 22b opposed to each other with the working section 12 interposed therebetween. Provided on the upper and lower surfaces of the working section 12 are adhesive bodies 23a and 23b, respectively. By the adhesive body 23a adhering to the supports 22a, the working section 12 is retained in the third position, and by the adhesive body 23b adhering to the supports 22b, the working section 12 is retained in the fourth position. The adhesive bodies 23a and 23b may alternatively be provided on the surfaces of the two supports 22a and 22b that face the adhesive bodies 23a and 23b, respectively.

(c) of FIG. 5 shows a case where a snap-fit retention mechanism is used. The return mechanism includes two supports 22a and 22b opposed to each other with the working section 12 interposed therebetween. The return mechanism includes an elastic body 24 that presses the working section 12 into the third position or the fourth position. When the working section 12 moves, the elastic body 24 elastically deforms.

(d) of FIG. 5 shows a case where a spring force is used as a retention force. The return mechanism includes: two supports 22a and 22b opposed to each other with the working section 12 interposed therebetween; and a third spring 3. The third spring 3 has a first end connected to a fixed member and a second end connected to the working section 12. In the third position, a restoring force of the third spring 3 having been compressed acts upward, and in the fourth position, a restoring force of the third spring 3 having been compressed acts downward.

Note that a retention force needs only act on the working section 12 either when the working section 12 is in the third position or when the working section 12 is in the fourth position. For example, in a case where a retention force acts on the working section 12 only when it is in the third position, the working section 12 is moved at a high speed by the first spring 1 during operation and the working section 12 returns at a speed corresponding to the speed of the operating section 11 during return. On the other hand, in a case where a retention force acts on the working section 12 only when it is in the fourth position, the working section 12 is moved at a speed corresponding to the speed of the operating section 11 during operation and the working section 12 is made to return at a high speed by the first spring 1 during return.

Embodiment 2

Another embodiment of the present invention is described below. The present embodiment differs from Embodiment 1 in that the working section makes a rotational motion.

(Workings of a Return Mechanism 30)

Figure 6:
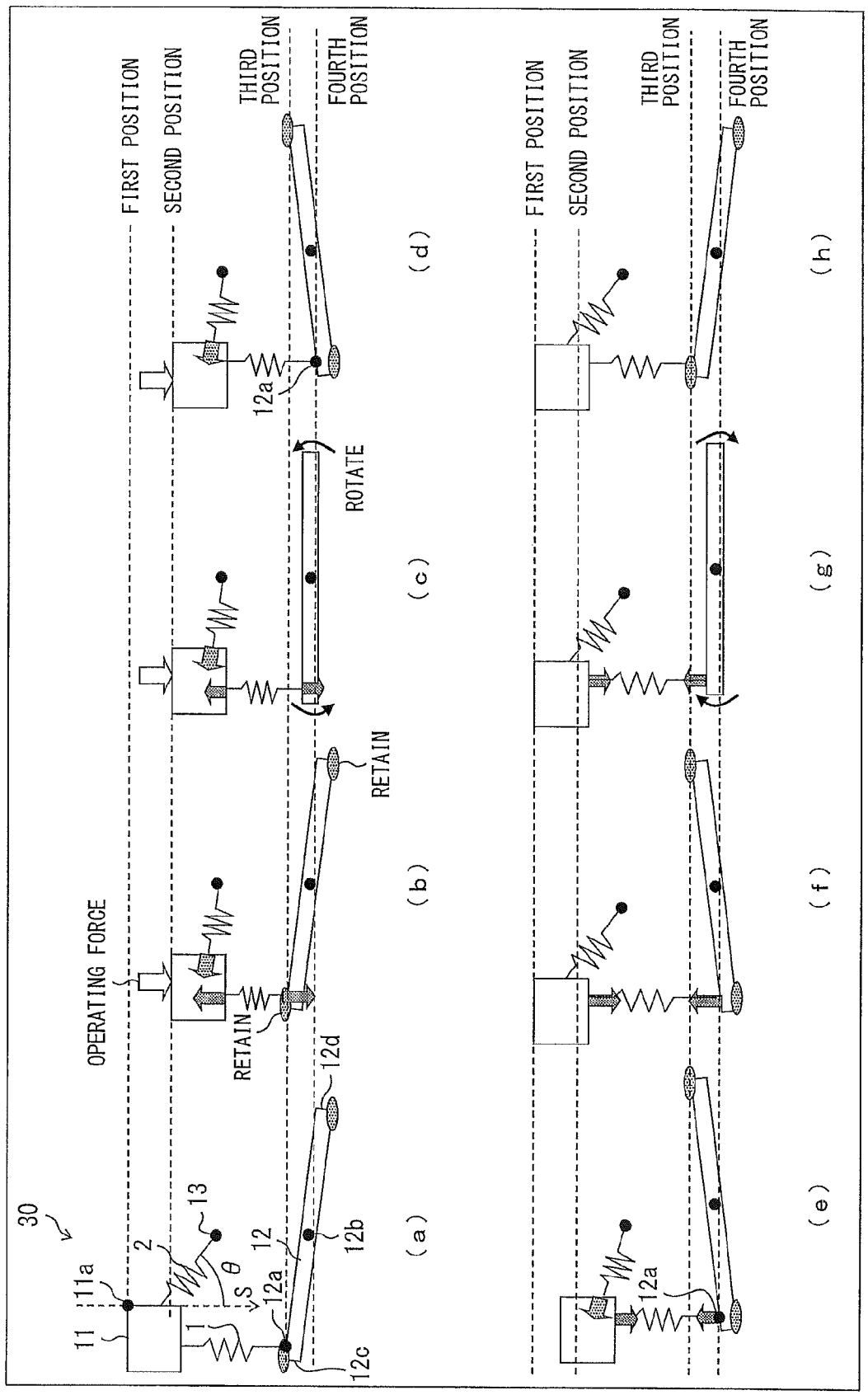
FIG. 6 is a diagram schematically showing operation and return action of a return mechanism according to another embodiment of the present invention.

FIG. 6 is a diagram schematically showing operation and return action of a return mechanism 30 of the present embodiment. The working section 12 is in the shape of a rod, and is rotatable at a point 12b serving as a fulcrum. The working section 12 has a first end 12c and a second end 12d. The working section 12 is connected to the first spring 1 at the working point 12a, which is located at the first end 12c. The working point 12a is a point on the working section 12 that is displaced along the same direction as that along which the first spring 1 is compressed or elongated. The working point 12a can be displaced between the third position and the fourth position. Magnetic forces by magnets (not illustrated) act on the first and second ends 12c and 12d of the working section 12, respectively. When the working point 12a is in the third position, the first end 12c of the working section 12 at the working point 12a is pulled upward by a retention force and the second end 12d of the working section 12 is pulled downward by a retention force.

(a) of FIG. 6 shows an initial state of the return mechanism 30. In the initial state, the working section 12 is retained in the third position by a retention force. Further, in the initial state, the operating point 11a is pressed into the first position by a restoring force of the second spring 2 having been compressed.

Application of an operating force to the operating section 11 as an external force causes the operating point 11a of the operating section 11 to be displaced from the first position to a second position (see (b) of FIG. 6). In response to the displacement of the operating point 11a, the second spring 2 and the first spring 1 are compressed. Further, since the second spring 2 changes its orientation in response to the displacement of the operating point 11a, the direction of action of the restoring force of the second spring 2 changes, too. The component, along the stroke axis S, of the restoring force of the second spring 2 acting on the operating section 11 is smaller when the operating point 11a is in the second position than in the first position. Therefore, the maximum operating force that is required can be reduced.

When torque by the first spring 1 having been compressed becomes larger than the retention force (torque) acting on the working section 12, the restoring force of the first spring 1 having been compressed causes the working section 12 to rotate, so that the operating point 12a is displaced from the third position to the fourth position (see (c) of FIG. 6). The working section 12, which has moved to the fourth position, is kept retained in the fourth position by a retention force (see (d) of FIG. 6). Thus, the action of the operating section 11 and the working section 12 during operation is completed.

When no operating force acts on the operating section 11 any longer, the restoring force of the second spring 2 having been compressed causes the operating section 11 to start to move from the second position to the first position (see (e) of FIG. 6). At this point in time, the working point 12a is kept retained in the fourth position by the retention force. Therefore, in response to the displacement of the operating section 11, the first spring 1 is elongated to be longer than its natural length (see (e) and (f) of FIG. 6).

When torque by the first spring 1 having been elongated becomes larger than the retention force (torque) acting on the working section 12, the restoring force of the first spring 1 having been elongated causes the working section 12 to rotate, so that the working point 12a is displaced from the fourth position to the third position (see (g) of FIG. 6). The working point 12a, which has been displaced to the third position, is kept retained in the third position by a retention force (see (h) of FIG. 6). Thus, the action of the operating section 11 and the working section 12 during return is completed.

The working section 12 is rotated by the first spring 1 when the restoring force of the first spring 1 having been elongated exceeds the retention force and the stored elastic energy is released. That is, the working section 12 is moved at a high speed by the first spring 1 regardless of the velocity of motion of the operating section 11.

Embodiment 3

Still another embodiment of the present invention is described below. The present embodiment differs from Embodiment 1 in that the operating section makes a rotational motion.

(Workings of a Return Mechanism 31)

Figure 7:
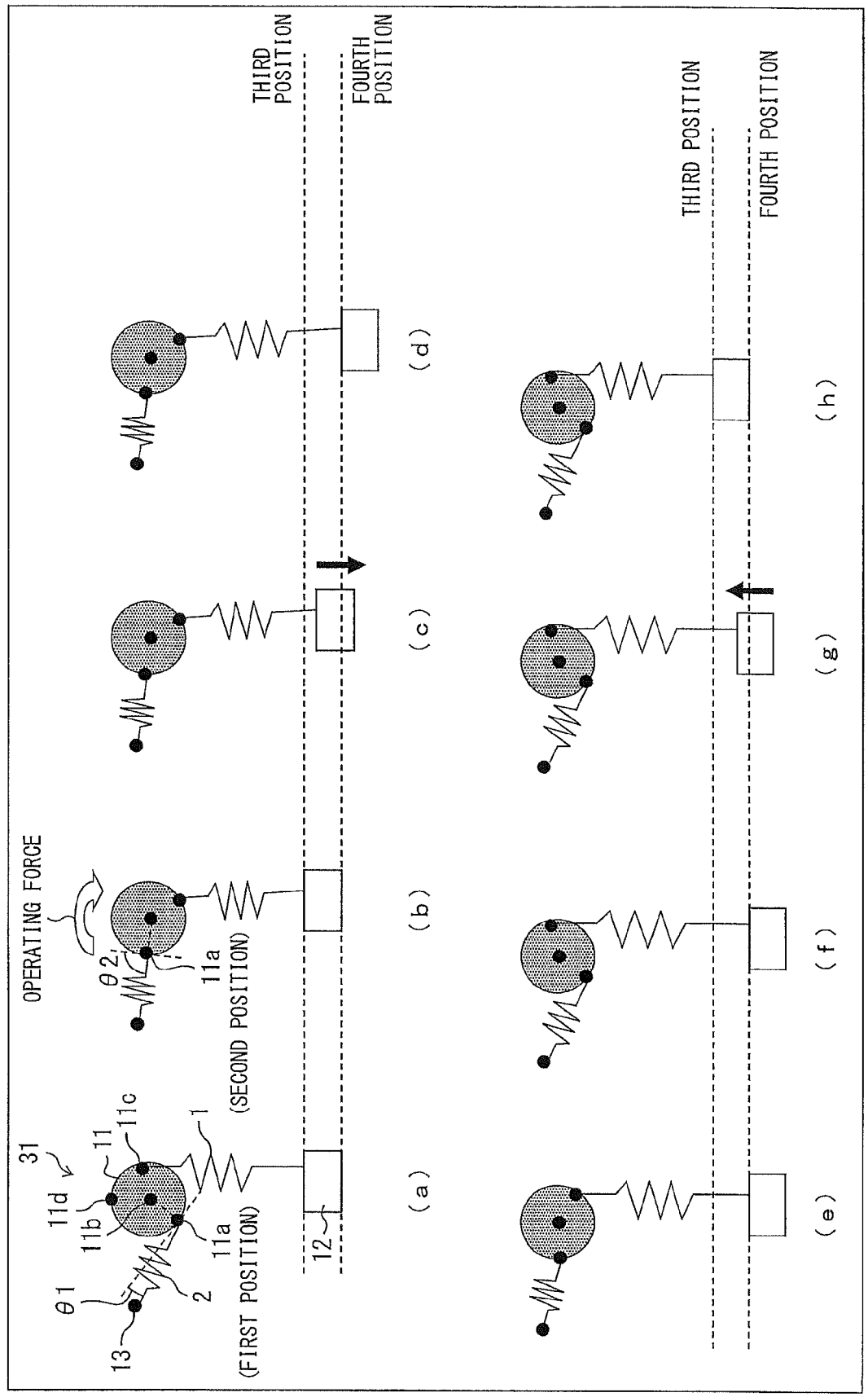
FIG. 7 is a diagram schematically showing operation and return action of a return mechanism according to still another embodiment of the present invention.

FIG. 7 is a diagram schematically showing operation and return action of a return mechanism 31 of the present embodiment. The operating section 11 is rotatable at a point 11b serving as a fulcrum. The operating section 11 is connected to the second spring at the operating point 11a. The operating point 11a is a point on the operating section 11 at which the operating section 11 is connected to (in contact with) the second spring 2. The operating point 11a can be displaced (rotate) between the first position and the second position. The first spring 1 is connected to the operating section 11 at a point 11c.

Let it be assumed that θ is the angle between the direction of action of the second spring 2 and the direction in which the operating point 11a returns (is displaced). Since the operating point 11a is circumferentially displaced, θ is the angle between the direction of a tangential line touching the circle at the operating point 11a and the direction of action of the second spring 2.

In an initial state, the operating point 11a is pressed into the first position by the restoring force of the second spring 2 having been compressed. Let it be assumed that θ1 is the angle θ that is formed when the operating point 11a is in the first position (see (a) of FIG. 7). When the operating point 11a is in the first position, a component which, of the resorting force of the second spring, acts as torque on the operating section 11 is cos θ1. Let it be assumed that a force (torque) acting counterclockwise on the operating section 11 is positive.

(b) of FIG. 7 shows a state in which the application of an operating force (torque) to the operating section 11 has caused the operating section 11 to rotate. The operating force causes the operating point 11a of the operating section 11 to be displaced from the first position to the second position. In response to the displacement of the operating point 11a, the point 11c is displaced, too, so that the second spring 2 and the first spring 1 are compressed. Further, since the second spring 2 changes its orientation in response to the displacement of the operating point 11a, the direction of action of the restoring force of the second spring 2 changes, too.

Let it be assumed that θ2 is the angle θ that is formed when the operating point 11a is in the second position. When the operating point 11a is in the second position, the component which, of the restoring force of the second spring 2, acts as torque on the operating section 11 is cos θ2. $0°<θ1<θ2<180°$, and $|\cos θ1|>|\cos θ2|$. That is, the component which, of the restoring force of the second spring 2, acts as torque on the operating section 11 (i.e. the component that acts in the direction of a tangential line touching the circle at the operating point 11a) is smaller when the operating point 11a is in the second position than in the first position. Therefore, when the user operates the operating section 11, a repulsive force by the second spring 2 becomes gradually smaller.

When a restoring force of the first spring 1 having been compressed becomes larger than the retention force acting on the working section 12, the working section 12 is displaced from the third position to the fourth position (see (c) of FIG. 7). The working section 12, which has moved to the fourth position, is kept retained in the fourth position by a retention force (see (d) of FIG. 7). Thus, the action of the operating section 11 and the working section 12 during operation is completed.

When no operating force acts on the operating section 11 any longer, the restoring force of the second spring 2 having been compressed causes the operating point 11a to start to move from the second position to the first position (see (e) of FIG. 7). At this point in time, the working section 12 is kept retained in the fourth position by the retention force. Therefore, in response to the displacement of the point 11c of the operating point 11a, the first spring 1 is elongated to be longer than its natural length (see (e) and (f) of FIG. 7).

When a restoring force of the first spring 1 having been elongated becomes larger than the retention force acting on the working section 12, the working section 12 is displaced from the fourth position to the third position (see (g) of FIG. 7). The working section 12, which has moved to the third position, is kept retained in the third position by a retention force (see (h) of FIG. 7). Thus, the action of the operating section 11 and the working section 12 during return is completed.

Even in such a case as that of the present embodiment where the operating section 11 rotates, the component which, of the restoring force of the second spring 2, acts as torque on the operating section 11 monotonically decreases with an increase in operation stroke (rotation of the operating section 11). Therefore, an increase in restoring force of the first spring 1 with an increase in operation stroke is at least partially canceled out. Therefore, the return mechanism 31 can reduce the maximum operating force that is required.

In FIG. 7, the operating section is described as a circular member. However, the operating section can be in any shape including the fulcrum 11b, the operating point 11a, and the point 11c. The return mechanism 31 may be configured such that the user directly rotate the operating section 11 or may be configured such that torque is applied to the operating section 11 by a component that makes a linear motion. When incorporated into a switching arrangement, the return mechanism 31 can be applied to a rocker switch, a rotary switch, or a lever switch. Alternatively, in a case where the return mechanism 31 is applied to a push-button switch, the direction in which a button is pressed can be freely set.

The return mechanism 31 has been described above as being configured such that the second spring 2 is compressed by operation. However, the return mechanism 31 may alternatively be configured such that the second spring 2 is elongated by operation. For example, the return mechanism 31 may alternatively be configured such that the second spring 2 is elongated to be loner than its natural length with the second spring 2 having its first end connected to a point 11d (see (a) of FIG. 7) on the operating section 11. (a) of FIG. 7 shows a state in which the operating section 11 is in the first position. In this configuration, too, clockwise rotation of the operating section 11 causes the second spring 2 to be further elongated, so that the angle θ increases. In this case, too, the second spring 2 acts in such a manner as to cause the operating section 11 to return to the first position.

Embodiment 4

Still another embodiment of the present invention is described below. The present embodiment differs from Embodiment 1 in that the operating section and the working section make rotational motions.

Figure 8:
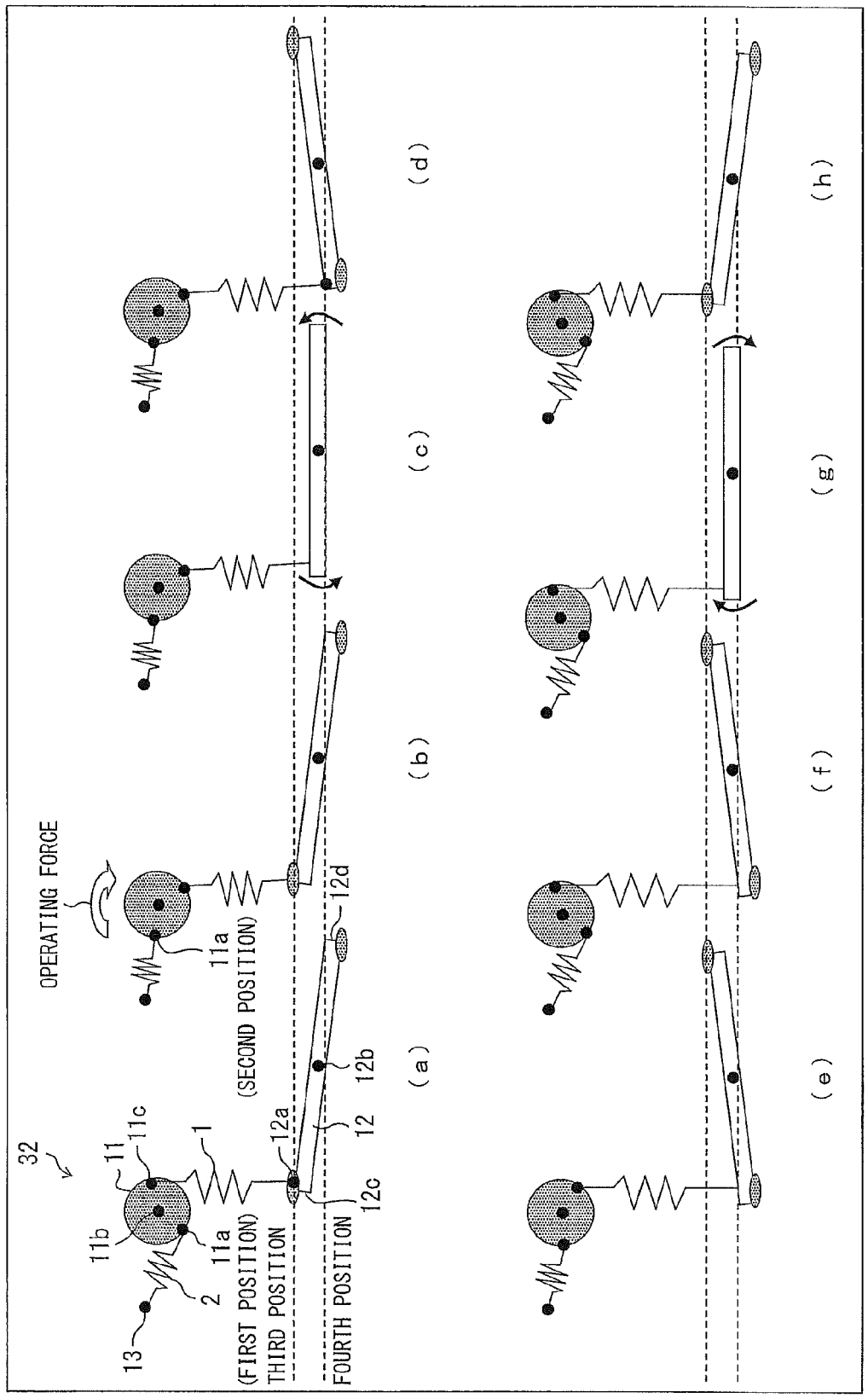
FIG. 8 is a diagram schematically showing operation and return action of a return mechanism according to still another embodiment of the present invention.

FIG. 8 is a diagram schematically showing operation and return action of a return mechanism 32 of the present embodiment. The operating section 11 is rotatable at a point 11b serving as a fulcrum. The working section 12 is in the shape of a rod, and is rotatable at a point 12b serving as a fulcrum. The return mechanism 32 is achieved by a combination of the rotatable working section 12 of Embodiment 2 and the rotatable operating section 11 of Embodiment 3. The operation and the return action are the same as those of Embodiments 2 and 3, and as such, are not described in detail below.

In the return mechanism 32, retention forces by magnets act on the first and second ends 12c and 12d of the working section 12, respectively. However, the return mechanism 32 may alternatively be configured such that a retention force acts only on either of the first and second ends 12c and 12d.

Embodiment 5

Specific Examples of the Second Spring

Figure 9:
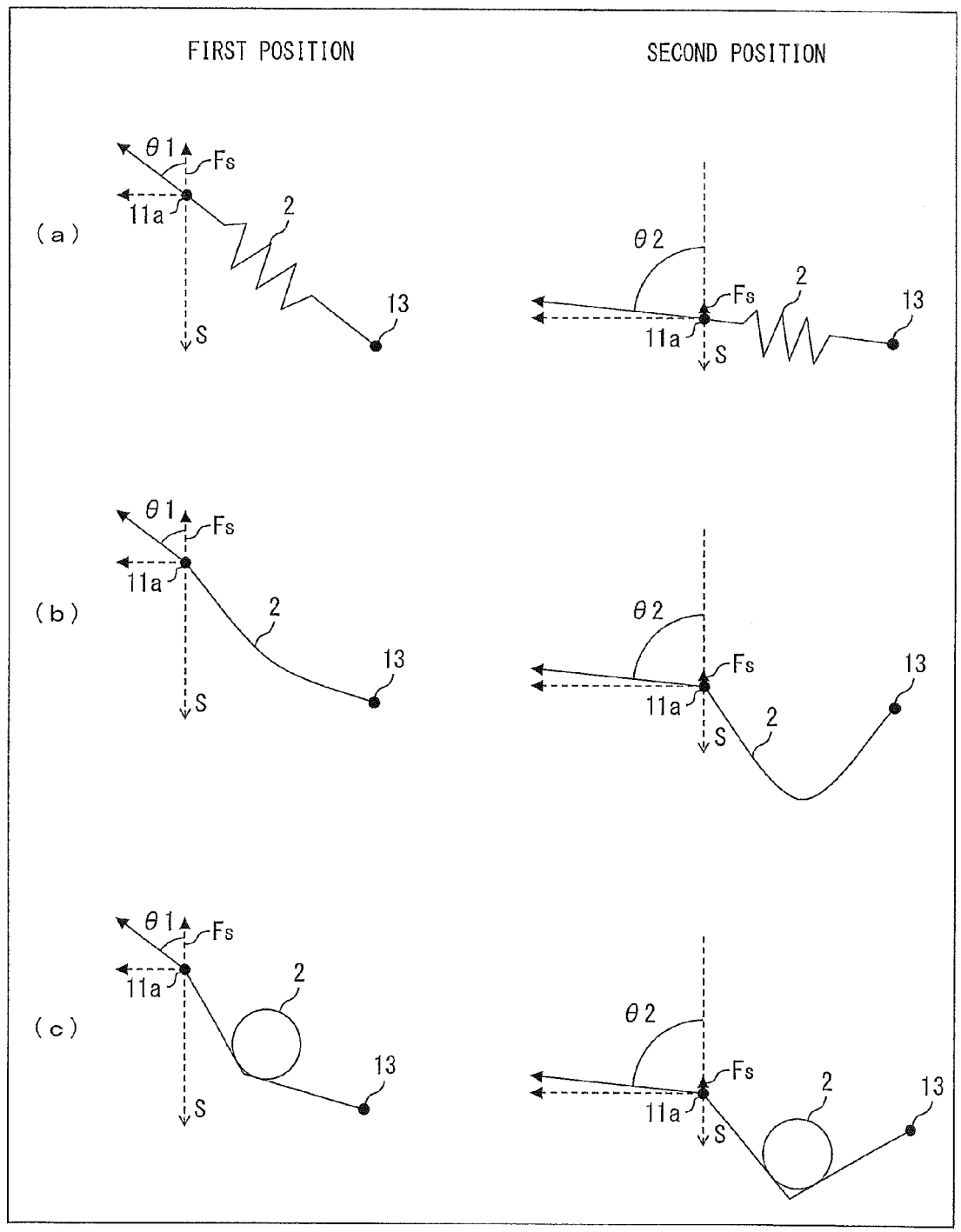
FIG. 9 is a diagram showing specific examples of a second spring.

FIG. 9 is a diagram showing specific examples of the second spring 2. In FIG. 9, the point on the operating section at which the second spring 2 is connected is described as the operating point 11a. (a) of FIG. 9 shows a case where the second spring 2 used is a coil spring. The coil spring has an advantage of being high in durability and stable in spring characteristics. (b) of FIG. 9 shows a case where the second spring 2 used is a plate spring. The plate spring has an advantage of being simple in shape and low in cost. (c) of FIG. 9 shows a case where the second spring 2 used is a torsion spring. The torsion spring has an advantage of being high in durability and placeable in a narrow space.

Without being limited to any of these examples, the second spring used may be a spring that has a positive spring constant in the direction in which it is compressed. Of course, any of these second springs can also be applied to a rotatable operating section.

In any of these cases, the second spring 2 may be elastically deformed so as to produce a restoring force in the first position. As illustrated, the second spring 2 produces a larger restoring force in the second position. Meanwhile, the angle θ is large (cos θ is small) in the second position. As a result, a component Fs, along the stroke axis S, of the restoring force of the second spring 2 in the second position is smaller than that in the first position.

Figure 10:
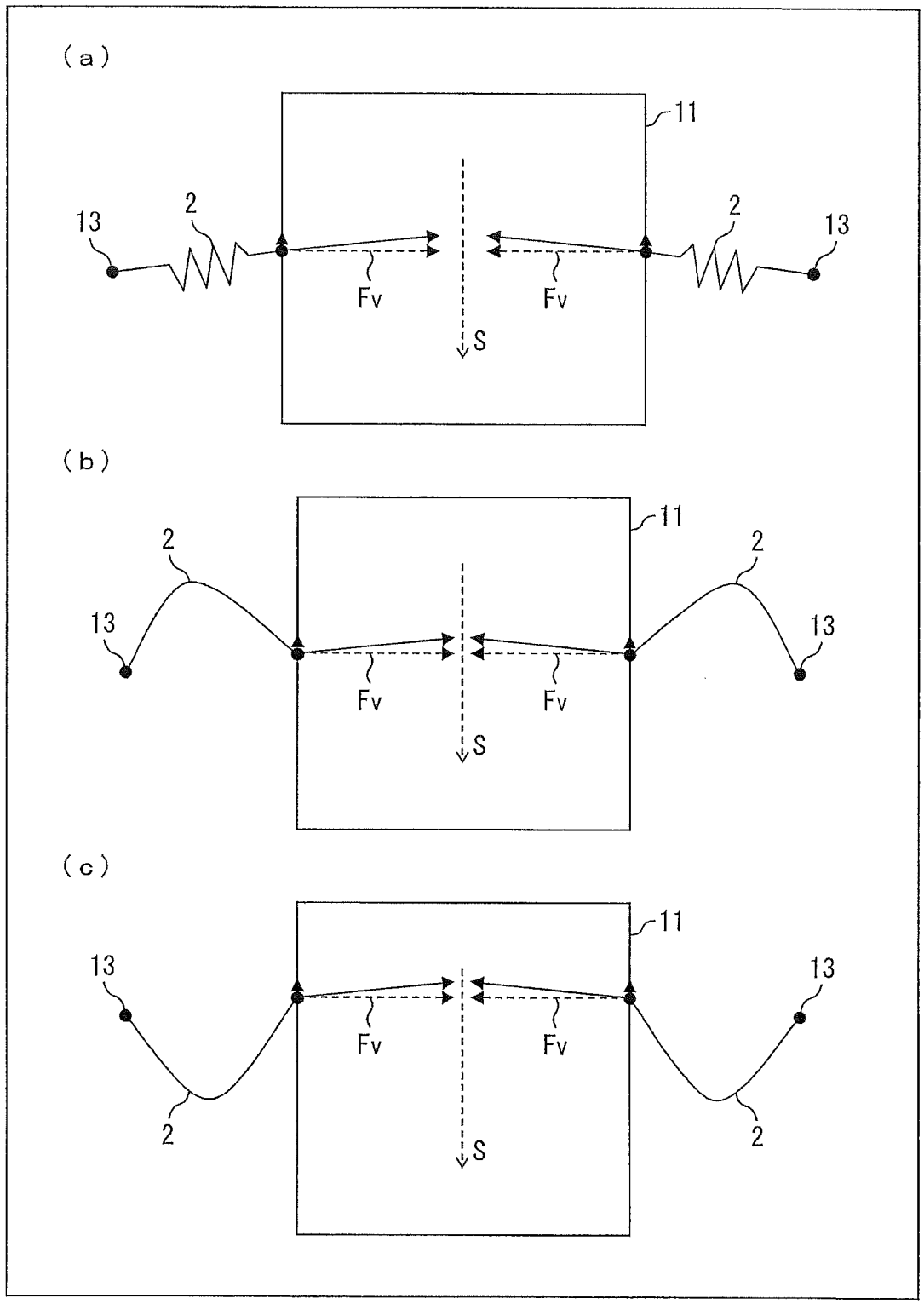
FIG. 10 is a diagram showing a configuration of two second springs arranged symmetrically with respect to an operating section.

FIG. 10 is a diagram showing a configuration of two second springs 2 arranged symmetrically with respect to an operating section 11. The two second springs 2 are placed on two sides of the single operating section 11, respectively. (a) of FIG. 10 shows a case where the two second springs 2 used are coil springs, and (b) and (c) of FIG. 10 each show a case where the two second springs 2 used are plate springs. FIG. 10 shows a case where the operating section 11 is in the second position.

The symmetrical arrangement of the two second springs with respect to the operating section 11 cancels out a component Fv which, of the restoring force of the second spring 2, is perpendicular to the stroke axis S. This makes it possible to reduce a force of friction that acts on the operating section 11.

Embodiment 6

Specific Examples of the First Spring

As in the case of the second spring, any of various springs can be used as the first spring. The term "spring" here refers to a member that produces a restoring force through elastic deformation. Elastic bodies that exhibit restoring forces can be used as the first spring and the second spring.

Figure 11:
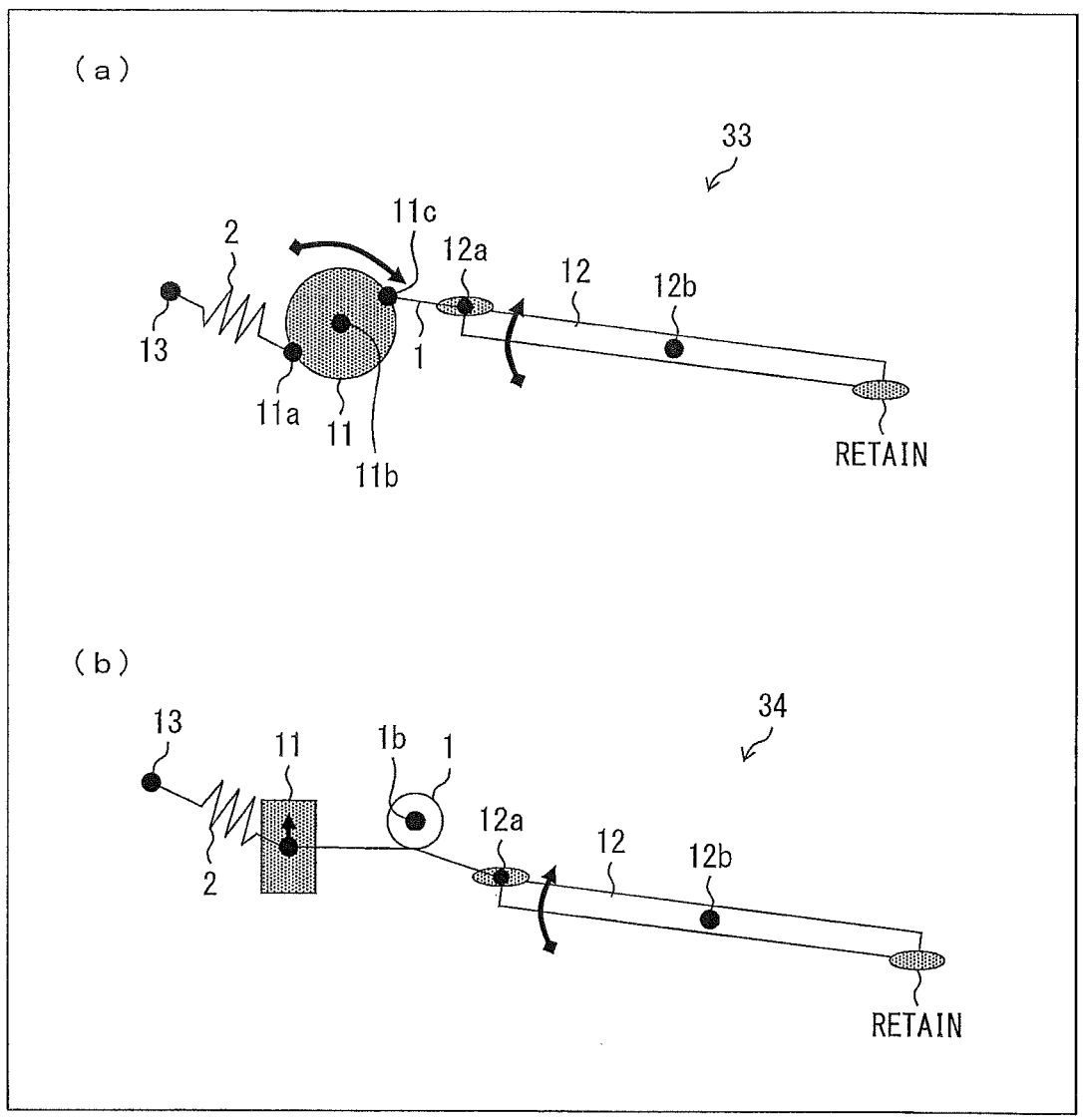
FIG. 11 is a diagram showing modifications of a first spring.

FIG. 11 is a diagram showing modifications of the first spring 1. (a) of FIG. 11 shows a return mechanism 33 whose first spring 1 is a plate spring. The operating section 11 and the working section 12 are rotatable.

(b) of FIG. 11 shows a return mechanism 34 whose first spring 1 is a torsion spring. The operating section 11 is vertically translatable, and the working section 12 is rotatable. The first spring 1 is rotatably supported at a fulcrum 1b. The operating section 11 is displaced to a higher position than it is in the initial state.

Embodiment 7

Still another embodiment of the present invention is described below. The present embodiment differs from Embodiment 4 in terms of the placement of each member.

Figure 12:
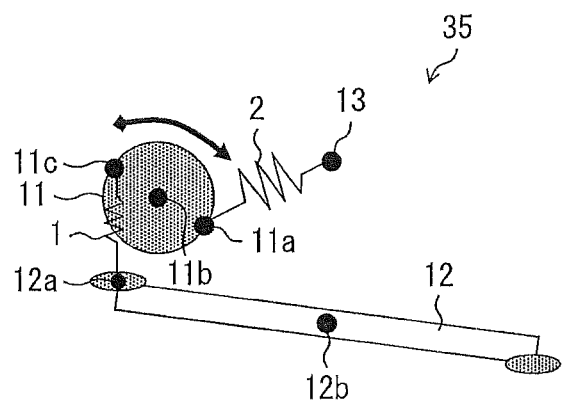
FIG. 12 is a diagram schematically showing a configuration of a return mechanism according to still another embodiment of the present invention.

FIG. 12 is a diagram showing a configuration of a return mechanism 35 of the present embodiment. In FIG. 12, the operating section 11 is in the first position, and the working section 12 is in the third position. Counterclockwise rotation places the operating section 11 in the second position. In the return mechanism 35, the operating section 11 and the second spring 2 are laid side-by-side above the working section 12. The return mechanism 35 can be placed in a narrow space.

Embodiment 8

Still another embodiment of the present invention is described below. The present embodiment differs from Embodiment 2 in that the present embodiment further includes a plunger.

Figure 13:
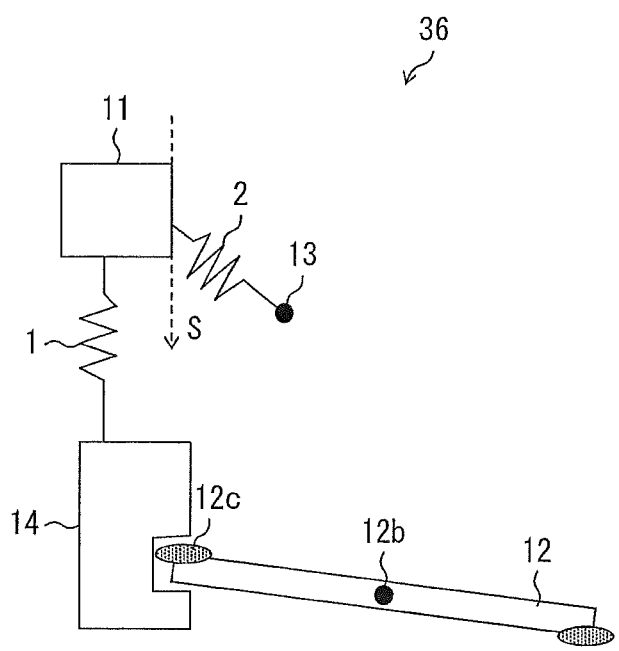
FIG. 13 is a diagram schematically showing a configuration of a return mechanism according to still another embodiment of the present invention.

FIG. 13 is a diagram showing a configuration of a return mechanism 36 of the present embodiment. The working section 12 is rotatable. The operating section 11 is translatable along the stroke axis S. The first spring 1 has a first end connected to the operating section 11 and a second end connected to a plunger 14 (junction component). The plunger is translatable along the stroke axis S. Since the plunger 14 has a recess formed therein and the working section 12 has its first end 12c inserted in the recess, the working section 12 rotates as the plunger 14 moves. There may be some play in a combination of the plunger 14 and the working section 12.

The working section 12 is retained in the third position by a retention force, and the working section 12 is retained in the fourth position by a retention force. The plunger 14 is retained in a position corresponding to the third position by the working section 12 when the working section 12 is in the third position, and the plunger 14 is retained in a position corresponding to the fourth position by the working section 12 when the working section 12 is in the fourth position.

Since the plunger 14 moves with respect to the operating section 11 via the first spring 1, the plunger 14 can be regarded as a working section. In this case, a retention force retains the plunger 14 in a predetermined position via the working section 12.

The operation and the return action are the same as those of Embodiment 2, and as such, are not described in detail below.

In the same way as the first spring 1 and the working section 12 may be connected to each other via the plunger 14, the first spring 1 (or the second spring 2) and the operating section 11 may be connected to each other via another component.

Embodiment 9

Still another embodiment of the present invention is described below. In the present embodiment, a switching arrangement including a return mechanism is described.

Figure 14:
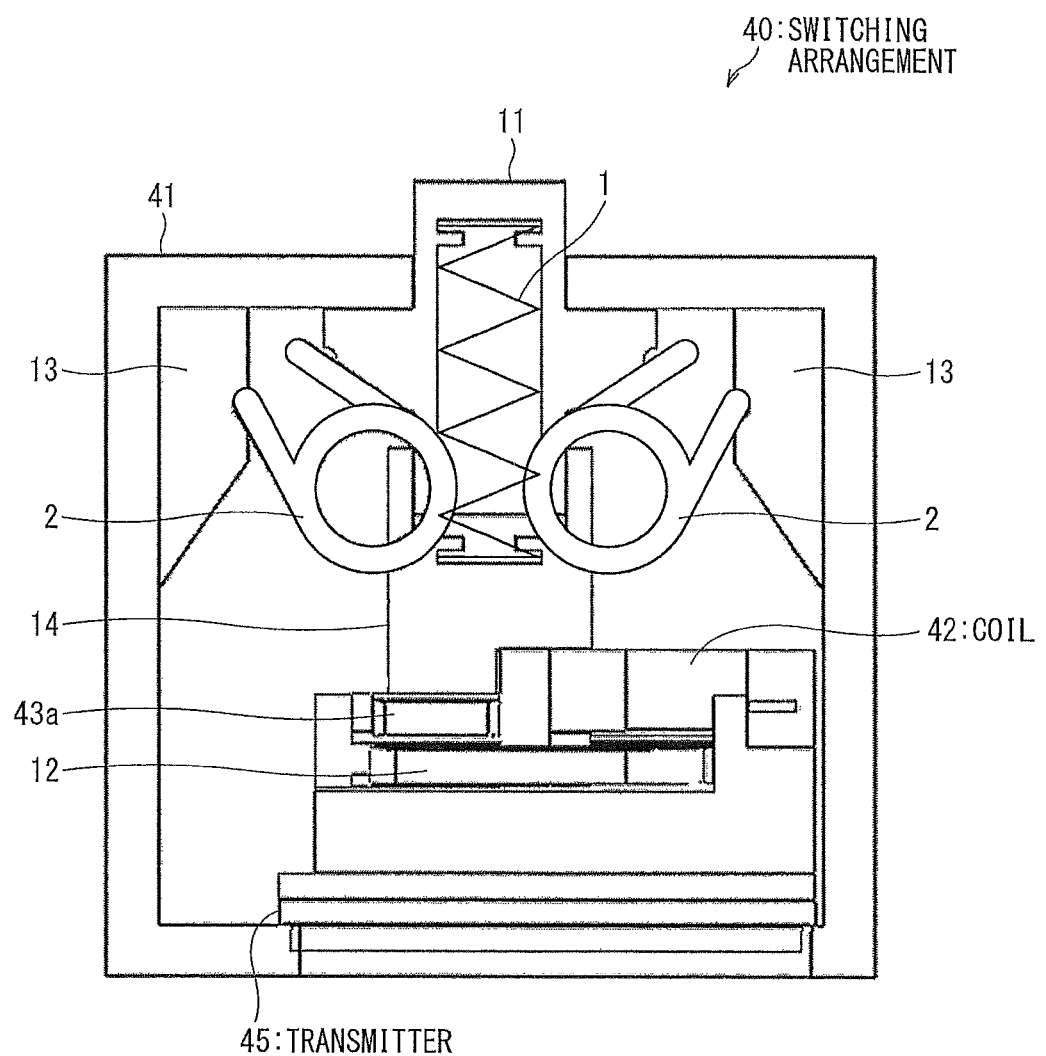
FIG. 14 is a side view showing a configuration of a switching arrangement according to still another embodiment of the present invention.
Figure 15:
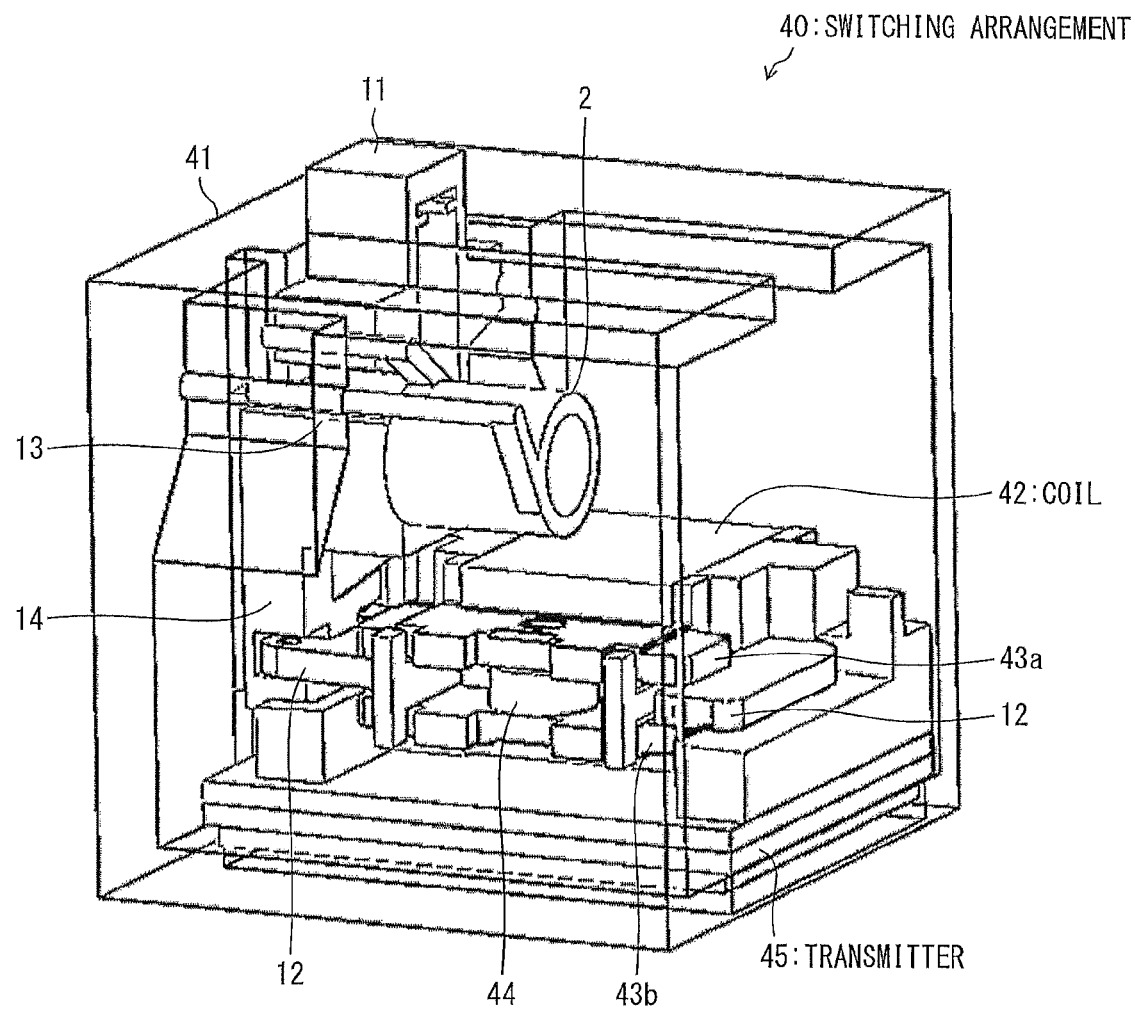
FIG. 15 is a perspective view showing a configuration of the switching arrangement.
Figure 16:
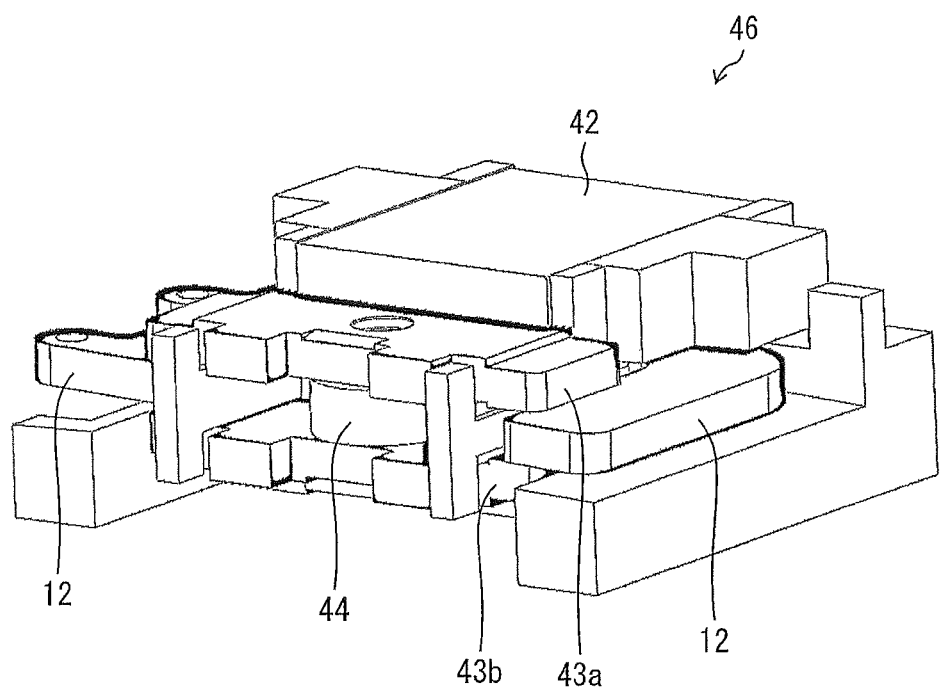
FIG. 16 is a perspective view showing a configuration of a power-generating module of the switching arrangement.
Figure 17:
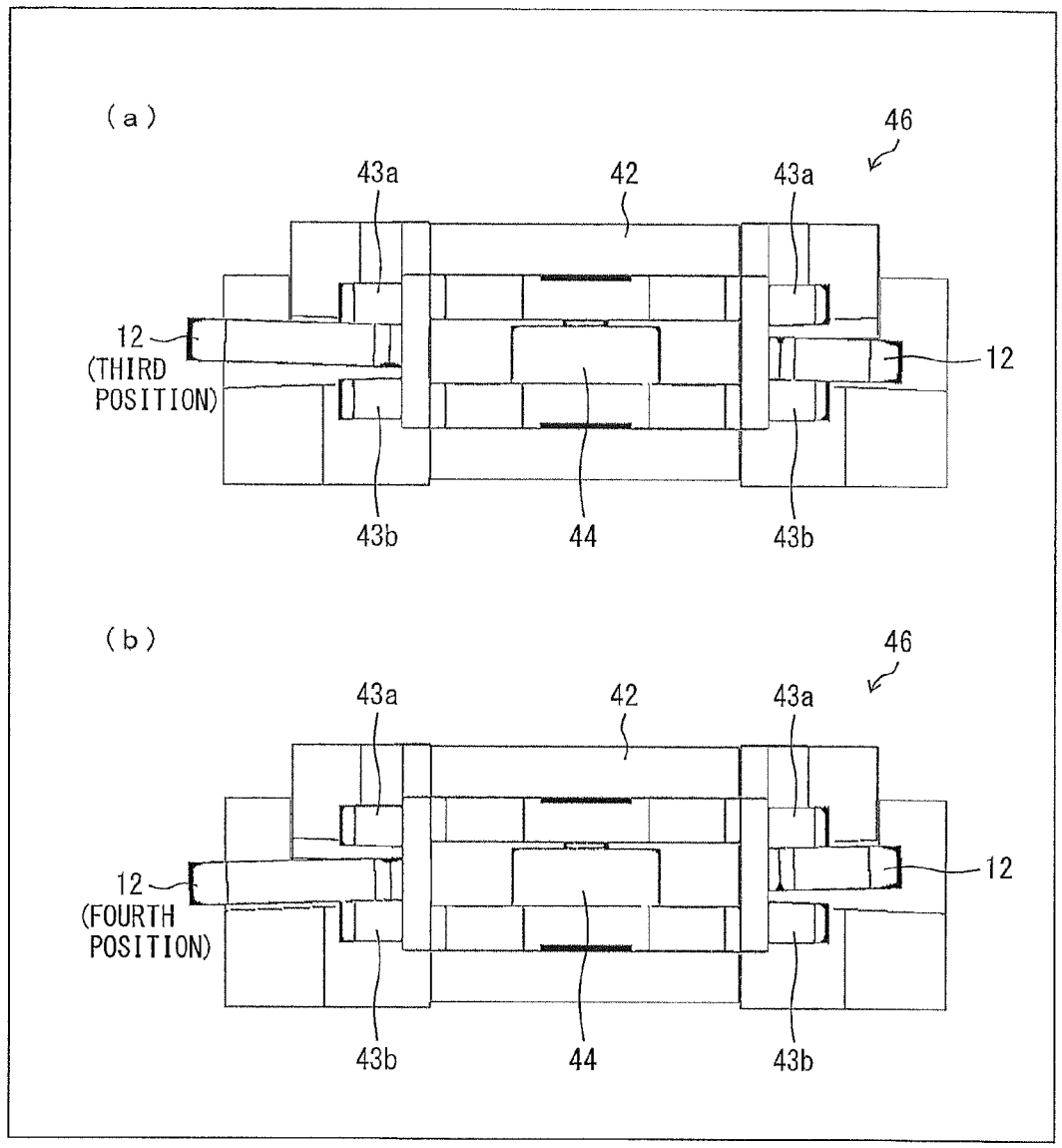
FIG. 17 is a front view showing a configuration of the power-generating module.

FIG. 14 is a side view showing a configuration of a switching arrangement 40 of the present embodiment. FIG. 15 is a perspective view showing a configuration of the switching arrangement 40. FIGS. 14 and 15 are internally transparent views showing a housing 41 etc. in partially transparent drawings. Further, FIG. 15 omits to show one of two second springs. FIG. 16 is a perspective view showing a configuration of a power-generating module 46. FIG. 17 is a front view showing a configuration of the power-generating module 46. FIGS. 16 and 17 also show a working section 12. (a) of FIG. 17 shows a state in which the working section 12 is in the third position, and (b) of FIG. 17 shows a state in which the working section 12 is in the fourth position.

The switching arrangement 40 includes the return mechanism 36 of Embodiment 8, the power-generating module 46, a transmitter 45, and the hosing 41. The housing 41 houses the return mechanism 36, the power-generating module 46, and the transmitter 45. The power-generating module 46 includes a coil 42, two yokes 43a and 43b, and a magnet 44. The working section 12 functions as an armature of the power-generating module 46. The power-generating module 46 and the return mechanism 36 function as a power generator.

The housing 41 has two opposed internal surfaces on which two bases 13 are provided, respectively. The operating section 11 is vertically translatable. The two second springs 2 are placed in (i) a space between one of the two bases 13 and the operating section 11 and (ii) a space between the other of the two bases 13 and the operating section 11, respectively. The second springs 2 here are torsion springs. The two second springs 2 are arranged symmetrically with respect to the operating section 11. When the operating section 11 is displaced downward by an operating force, the second springs 2 are bent while changing their orientations.

The first spring 1 is placed between the operating section 11 and the plunger 14. The first spring 1 is a coil spring. The plunger 14 is vertically translatable.

The plunger 14 has a recess in which the working section 12 is inserted. The working section 12 is a ferromagnetic body such as iron. The working section 12 is in the shape of the letter U. The working section 12 is rotatable between the two yokes 43a and 43b at a fulcrum located near the center (i.e. near the magnet 44). The two yokes 43a and 43b are magnetized by the magnet 44 (permanent magnet) placed therebetween. The working section 12 is placed in such a manner as to pass through the coil 42.

When in the third position (see (a) FIG. 17), the working section 12 has its first end in contact with the yoke 43a and its second end in contact with the yoke 43b. When having been rotated into the fourth position (see (b) FIG. 17), the working section 12 has its first end in contact with the yoke 43b and its second end in contact with the yoke 43a. Since the two yokes 43a and 43b have opposed surfaces that are opposite in magnetic polarity to each other, movement of the working section 12 from the third position to the fourth position causes the direction of magnetization of the working section 12 to be reversed. Accordingly, the orientation of a magnetic flux passing through the coil 42 is reversed, and an induced current corresponding to the change in magnetic flux flows through the coil 42. This is how the switching arrangement 40 generates electrical power. A larger change in magnetic flux per unit time means that a larger induced current flows. The switching arrangement 40 is high in power generation efficiency since the working section 12 can be moved at a high speed by the first spring 1. Further, the switching arrangement 40 is high in operability since the maximum operating force that is required to operate the operating section 11 can be reduced without causing an increase in operation stroke.

The coil 42 is connected to the transmitter 45, for example, via a lead wire. The transmitter 45 transmits, wirelessly or by cable, a signal to an external device by using electrical power generated by the coil 42. When the operating section 11 has been operated from the first position to the second position, (i.e. when the working section 12 has moved from the third position to the fourth position), the transmitter 45 transmits, to the external device, a signal indicating that the operating section 11 is in the second position. On the other hand, when the operating section 11 has returned from the second position to the first position, (i.e. when the working section 12 has returned from the fourth position to the third position), the transmitter 45 transmits, to the external device, a signal indicating that the operating section 11 is in the first position.

Therefore, the switching arrangement 40 functions as a switching arrangement that transmits, to an external device, a signal corresponding to a position of the operating section 11. The switching arrangement 40 can be used as an operating switch that a user operates, a limit switch (detection switch) that detects a position of an object, and the like.

Note that the transmitter 45 can also be configured to, regardless of position of the operating section 11, transmit a predetermined signal by using generated electrical power. Further, the power-generating module 46 and the return mechanism 36 can be used as a mere power generator.

Note that the switching arrangement 40 can also be configured to have a battery or an external power source instead of the power-generating module 46. In this case, the transmitter 45 generates a signal corresponding to a position of the working section 12 by using electrical power that is supplied from the battery or the external power source.

Note that the switching arrangement 40 can also be configured such that a user or an object whose position is to be detected operates the operating section 11 directly or indirectly.

Figure 18:
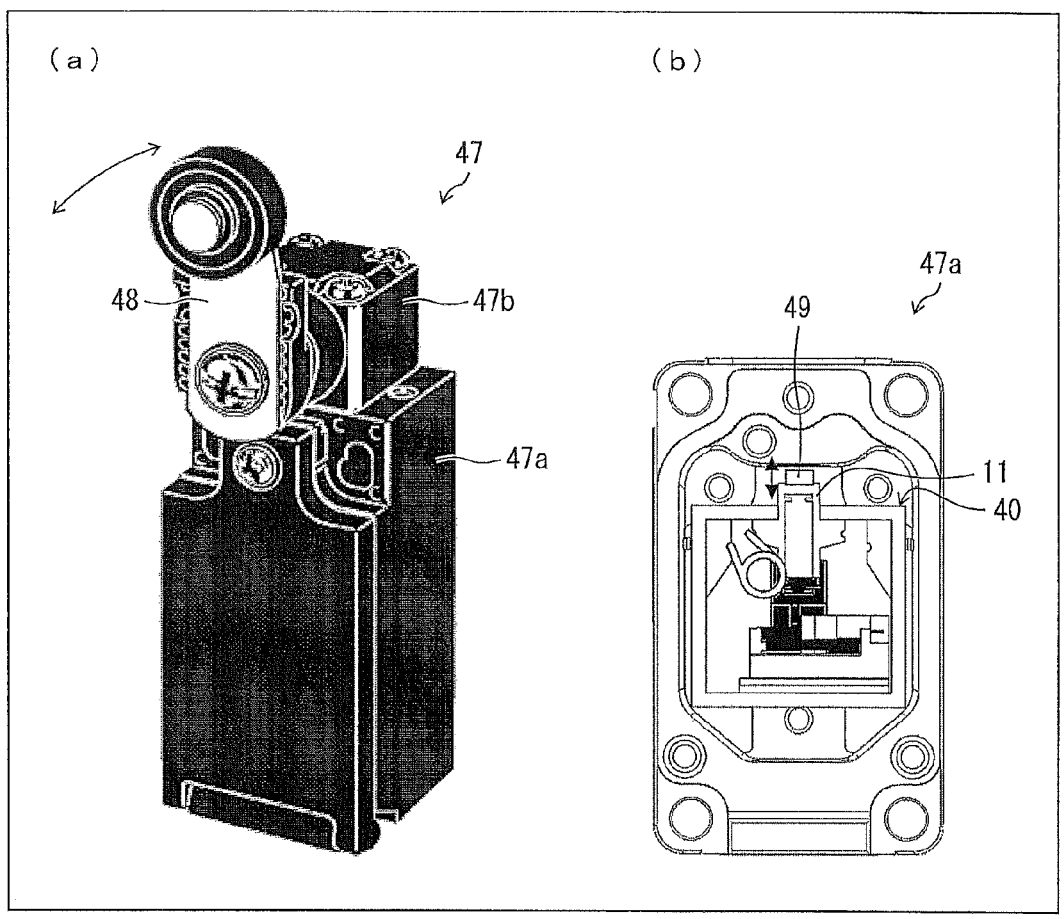
FIG. 18 is a diagram showing a configuration of a limit switch including a rotatable lever.

FIG. 18 is a diagram showing a configuration of a limit switch 47 including a rotatable lever. (a) of FIG. 18 is a perspective view showing the configuration of the limit switch 47, and (b) of FIG. 18 is a front view (partially transparent view) showing a configuration of a switch body 47a.

The limit switch 47 includes a switch body section 47a and an operation auxiliary section 47b. The switch body section 47a includes a switching arrangement 40 and a plunger 49 inside a housing thereof. The operation auxiliary section 47b includes a rotatable lever 48. An object makes contact with the lever 48 to rotate the lever 48. The plunger 49 is vertically translated in tandem with rotation of the lever 48. The operating section 11 of the switching arrangement 40 is vertically translated in tandem with movement of the plunger 49.

Embodiment 10

Still another embodiment of the present invention is described below. For example, there is a case where the working section should be moved at a high speed for increasing the amount of electricity that is generated by the motion of the working section or for turning on or off the switch at a high speed. In the present embodiment, a configuration is described in which a third spring that acts on the working section is provided instead of a second spring.

(Configuration of a Return Mechanism 50)

Figure 21:
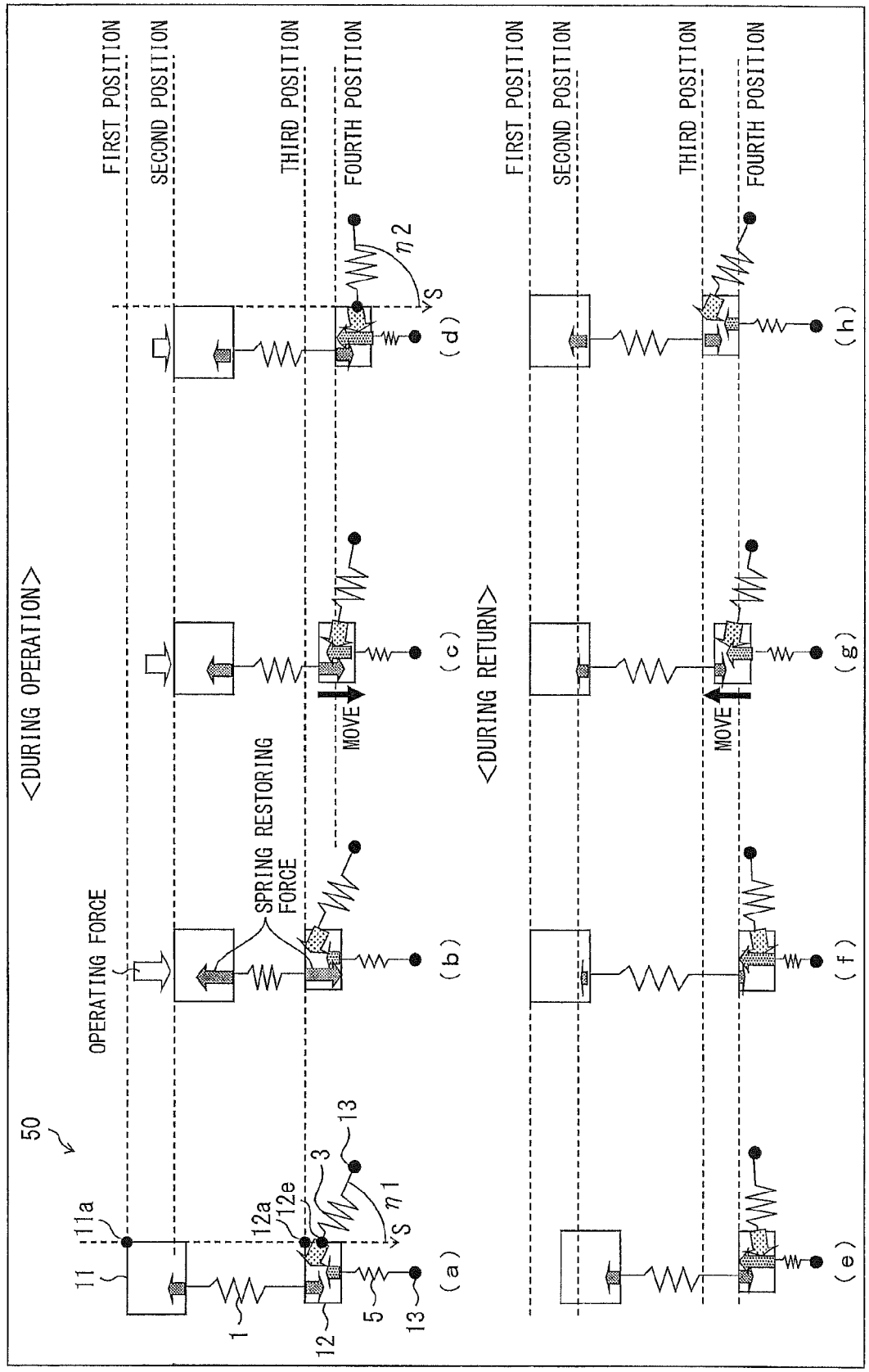
FIG. 21 is a diagram schematically showing operation and return action of a return mechanism according to still another embodiment of the present invention.

FIG. 21 is a diagram schematically showing operation and return action of a return mechanism 50 of the present embodiment. The present embodiment is directed to a return mechanism including an operating section 11 configured to return by itself and a working section 12 configured to return by itself and to move at a high speed regardless of the speed of operation. A motion of the working section 12 at a higher speed can be achieved by a third spring 3. Further, a fifth spring 5 allows the operating section 11 and the working section 12 to return by themselves. In the present embodiment, by devising the configuration (arrangement) of the third spring 3, the working section 12 is moved at a higher speed.

The return mechanism 50 (acceleration mechanism) includes the operating section 11, the working section 12, a base 13, a first spring 1, a third spring 3, and a fifth spring 5. The first spring 1 connects the operating section 11 and the working section 12 to each other. The third spring 3 connects the working section 12 and the base 13 to each other. The fifth spring 5 connects the working section 12 and the base 13 to each other. The base 13 needs only be fixed, and may be divided into separate parts, namely a part to which the third spring 3 is connected and a part to which the fifth spring 5 is connected. The operating section 11 and the working section 12 are movable along a stroke axis S. A direction of application of a force to the operating section 11 by the first spring 1 is parallel to a direction along which the operating section 11 is movable. Further, a direction of application of a force to the working section 12 by the fifth spring 5 is parallel to a direction along which the working section 12 is movable.

Meanwhile, a direction of application of a force to the working section 12 by the third spring 3 is at an oblique angle to the direction along which the working section 12 is movable. Let it be assumed that η is the angle between the direction of application of a force to the working section 12 by the third spring 3 and the stroke axis S. The third spring 3 has a first end connected to the base 13, and the first end does not move. On the other hand, the third spring 3 has a second end connected to the working section 12, and the second end moves as the working section 12 moves. Therefore, when the working section 12 moves along the stroke axis S, the angle η changes accordingly.

The working section 12 is connected to the third spring 3 at a connection point 12e. The connection point 12e is a point at which the working section 12 is connected to the third spring 3, and is a point on the working section 12 that is displaced along the same direction as that along which the first spring 1 is compressed or elongated. The working point 12a can be displaced from the third position to the fourth position. When the working section 12 is in the third position, a retention force is acting on the working section 12 so as to retain the working section 12 in the third position. When the working section 12 is in the fourth position, a retention force is acting on the working section 12 so as to retain the working section 12 in the fourth position. Specifically, the working section 12 is retained in the third position by a magnetic force acting thereon when it is in the third position, and the working section 12 is retained in the fourth position by a magnetic force acting thereon when it is in the fourth position.

(Workings of a Return Mechanism 50)

(a) of FIG. 21 shows an initial state of the return mechanism 50. Spring forces that act on the operating section 11 and the working section 12 are illustrated by arrows, but the lengths of the arrows are not meant to indicate the accurate magnitude of the forces. The initial state is a state in which no external force is being applied to the operating section 11. In the initial state, the working section 12 is retained in the third position by a restoring force of the fifth spring 5 having been compressed, a restoring force of the third spring 3 having been compressed, and a retention force (not illustrated). Further, in the initial state, the operating section 11 is pressed into the first position by a restoring force of the first spring 1 having been compressed. Let it be assumed that η1 is the angle η that is formed when the working section 12 is in the third position. The angle η is an angle between a direction in which the working section 12 returns and a direction of application of a restoring force of the third spring 3 to the working section 12. When the working section 12 is in the third position, a component, along the stroke axis S, of the resorting force of the third spring acting on the working section 12 (i.e. a component that acts in a direction of motion of the working section 12) is cos η1. Let it be assumed that a force acting upward on the working section 12 (i.e. a force acting in the direction of return of the working section 12) is positive.

(b) of FIG. 21 shows a state in which the application of, an operating force (operating force) to the operating section 11 has caused the operating section 11 to be displaced. Application of the operating force to the operating section 11 as an external force causes the operating section 11 to be displaced from the first position to the second position. In response to the displacement of the operating section 11, the first spring 1 is compressed.

When a restoring force of the first spring 1 having been compressed becomes larger than the sum of the restoring force of the third spring 3 acting on the working section 12, the restoring force of the fifth spring 5 acting on the working section 12, and the retention force acting on the working section 12, the restoring force of the first spring 1 having been compressed causes the working section 12 to be displaced from the third position to the fourth position (see (c) of FIG. 21). The working section 12, which has been displaced to the fourth position, is kept retained in the fourth position by a retention force (see (d) of FIG. 21). Further, since the third spring 3 changes its orientation in response to the displacement of the connection point 12e of the working section 12, the direction of action of the restoring force of the third spring 3 changes, too. A direction in which a force of the third spring 3 is applied to the working section 12 when the working section 12 is in the third position is not parallel to a direction in which a force of the third spring 3 is applied to the working section 12 when the working section 12 is in the fourth position.

Let it be assumed that η2 is the angle η that is formed when the working section 12 is in the fourth position. When the working section 12 is in the fourth position, the component, along the stroke axis S, of the restoring force of the third spring 3 acting on the working section 12 is cos η2. 0°η1<η2<180°, and cos η1>cos η2. That is, the component, along the stroke axis S, of the restoring force of the third spring 3 acting on the working section 12 (i.e. the component in which the direction in which the working section 12 returns is positive) is smaller when the working section 12 is in the fourth position than in the third position, and monotonically decreases. Therefore, when the working section 12 starts to move from the third position to the fourth position, a repulsive force by the third spring 3 becomes gradually smaller. Therefore, when the working section 12 starts to move, the working section 12 is further accelerated. This means that the working section 12 works (moves) at a higher speed than that of Reference Example 2, which will be described later. Thus, the action of the operating section 11 and the working section 12 during operation is completed.

The working section 12 is moved by the first spring 1 when the restoring force of the first spring 1 having been compressed exceeds the sum of the component, along the stroke axis S, of the restoring force of the third spring 3, the restoring force of the fifth spring 5, and the retention force and the stored elastic energy is released. That is, the working section 12 is moved at a high speed by the first spring 1 regardless of the velocity of motion of the operating section 11.

When no operating force acts on the operating section 11 any longer, the restoring force of the first spring 1 having been compressed causes the operating section 11 to start to move from the second position to the first position (see (e) of FIG. 21). At this point in time, the working section 12 is kept retained in the fourth position by the retention force and the restoring force of the first spring 1. However, the restoring force of the first spring 1 becomes gradually smaller as the operating section 11 is displaced. The operating section 11 moves to the first position (see (f) of FIG. 21).

When the sum of the restoring force of the first spring 1 having been compressed and the retention force becomes smaller than the sum of the component, along the stroke axis S, of the restoring force of the third spring 3 and the restoring force of the fifth spring 5, the restoring force of the fifth spring 5 having been compressed causes the working section 12 to be displaced from the fourth position to the third position (see (g) of FIG. 21). The working section 12, which has moved to the third position, is kept retained in the third position by the retention force (see (h) of FIG. 21).

When the working section 12 starts to move from the third position toward the fourth position, an upward force by the third spring 3 (i.e. the component in which the direction in which the working section 12 returns is positive) becomes gradually larger. Therefore, when the working section 12 starts to move, the working section 12 is further accelerated. In this manner, the presence of the third spring 3 makes it possible to cause the working section 12 to move at a high speed during return, too. Thus, the action of the operating section 11 and the working section 12 during return is completed.

The working section 12 is moved by the fifth spring 5 when the elastic energy stored in the fifth spring 5 is released. That is, the working section 12 is moved at a high speed by the fifth spring 5 regardless of the velocity of motion of the operating section 11 that returns.

The fifth spring 5, which is provided here to cause the working section 12 to return, can be omitted. For example, if the component, along the stroke axis S, of the restoring force of the third spring 3 when the working section 12 is in the fourth position is upward ($\eta 2 < 90°$) and is larger than the sum of the retention force and the restoring force of the first spring, the working section 12 can be caused by the restoring force of the third spring to return to the third position. Further, in the presence of a returning spring (fifth spring 5), the angle $\eta 1$, which is formed when the working section 12 is in the third position, may be larger than 90°.

(FS Characteristic)

Figure 22:
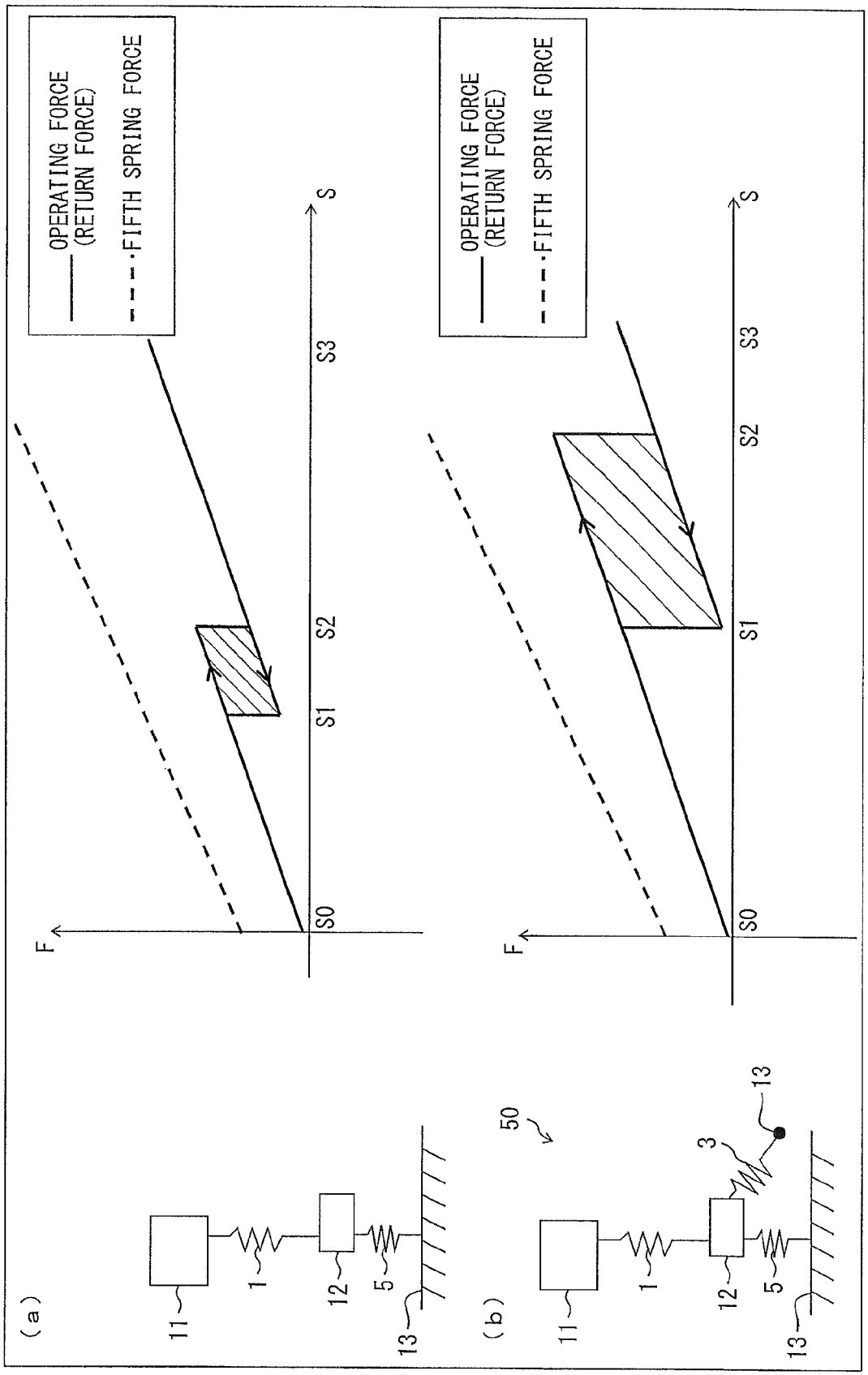
FIG. 22 is a diagram showing an FS characteristic of the return mechanism.

FIG. 22 is a diagram showing an FS characteristic of the return mechanism 50 of the present embodiment. The horizontal axis represents S (stroke) of the operating section 11, and the vertical axis represents F (force). FIG. 22 shows the force of the fifth spring 5 (fifth spring force) and the operating force. The operating force that is required for operation at each stroke position is equal to the repulsive force of the first spring. A positive force indicates that an upward force is being applied to the operating section 11 (in the direction from the second position to the first position).

Reference Example 2

(a) of FIG. 22 shows a configuration and FS characteristics of Reference Example 2. A return mechanism of Reference Example 2 is one obtained by excluding the third spring 3 from the return mechanism 50 of the present embodiment. Because of the retention force acting on the working section 12, the FS characteristic exhibits hysteresis. The first position of the operating section 11 may vary between the top dead center (S0) of the operating section 11 and the stroke S1. The second position of the operating section 11 may vary between the stroke S2 and the bottom dead center (S3) of the operating section 11.

(During Operation)

The operating section 11 is displaced from the top dead center (S0) of the operating section 11 by the application of an operating force to the operating section 11. When the operating section 11 has reached the stroke S2, the restoring force of the first spring 1 having been compressed exceeds the sum of the retention force by which the working section 12 is retained in the third position and the fifth spring force. Therefore, at the stroke S2, the working section 12 is displaced from the third position to the fourth position. Along with this displacement, the first spring 1, which has been compressed, is released. At the same time, the operating force lowers, too.

A further increase in stroke of the operating section 11 from the stroke S2 causes the first spring 1 to be compressed again, so that the operating force increases.

(During Return)

On the other hand, when a weaker external force (operating force) is applied to the operating section 11, the first spring force causes the operating section 11 to return. The return of the operating section 11 in the direction from the second position to the first position causes the first spring 1 to become less compressed. When the operating section 11 has reached the stroke S1, the restoring force of the fifth spring 5 exceeds the sum of the retention force by which the working section 12 is retained in the fourth position and the first spring force. Therefore, at the stroke S1, the working section 12 is displaced from the fourth position to the third position. Along with this displacement, the first spring 1 is compressed. At the same time, the return force increases.

A further decrease in stroke of the operating section 11 from the stroke S1 causes the first spring 1 to be less compressed.

(FS Characteristic of the Return Mechanism 50)

(b) of FIG. 22 shows a configuration and FS characteristic of the return mechanism 50 of the present embodiment. As in Reference Example 2, the working section 12 moves from the third position to the fourth position at the stroke S2, and the working section 12 moves from the fourth position to the third position at the stroke S1.

Since the return mechanism 50 is one obtained by adding the third spring to that of Reference Example 2, displacement of the working section 12 from the third position to the fourth position requires application of a larger operating force to the operating section 11. Further, as mentioned above, displacement of the working section 12 to the fourth position causes the component, along the stroke axis S, of the force of the third spring 3 to become smaller, assuming that the direction in which the working section 12 returns from the fourth position to the third position is positive. This makes it possible to release the compression of the first spring 1 by setting a longer distance for the working section 12 to move. Therefore, the amount of decrease in operating force at the stroke S2 is larger than the amount of decrease in Reference Example 2. This gives a high click rate and a satisfactory operational feeling. In FIG. 22, the shaded areas represent energy that is provided to the working section 12 during operation and return.

In the return mechanism 50 of the present embodiment, greater energy can be provided to the working section 12 than in Reference Example 2. That is, the working section 12 can be moved at a high speed. In a case where electric power is generated by a combination of the working section 12 of the return mechanism 50 and the aforementioned power-generating module, a kinetic energy of the working section 12 can be made high, and the amount of electric power that is generated can therefore be made larger. Further, the amount of electric power that is generated can be made larger (the working section can be moved at a high speed) without a larger magnetic force (retention force) being generated by the magnet of the power-generating module.

This return mechanism 50 can be provided in a switching arrangement as in the case of the aforementioned embodiment. Use of the return mechanism 50 makes it possible to perform a switching operation at a high speed. Further, in a case where the working section 12 as a movable contact for an electrode terminal, the opening speed is so high that the duration of an arc that is formed between the contact points is short and erosion can be inhibited.

Embodiment 11

A still another embodiment of the present invention is described below. The present embodiment differs from Embodiment 10 in that the present embodiment includes a fourth spring for use in return instead of the fifth spring.

(Configuration of a Return Mechanism 51)

Figure 23:
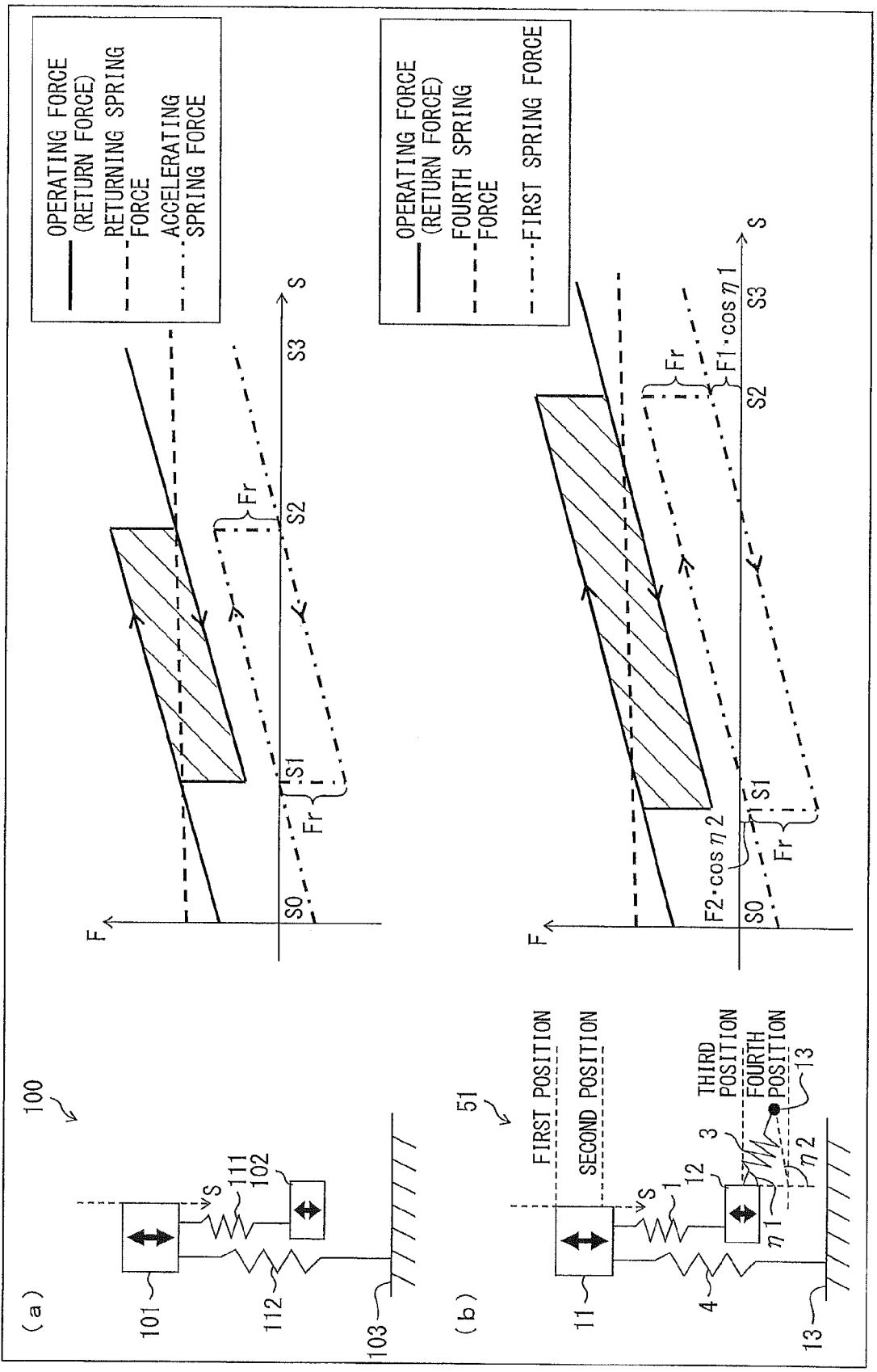
FIG. 23 is a diagram showing a configuration of a return mechanism according to still another embodiment of the present invention and an FS characteristic thereof.

(b) of FIG. 23 shows a configuration and FS characteristic of a return mechanism 51 of the present embodiment. The fourth spring 4 allows the operating section 11 and the working section 12 to return by themselves.

The return mechanism 51 (acceleration mechanism) includes the operating section 11, the working section 12, a base 13, a first spring 1, a third spring 3, and the fourth spring 4. The fourth spring 4 connects the operating section 11 and the base 13 to each other. The base 13 needs only be fixed, and may be divided into separate parts, namely a part to which the third spring 3 is connected and a part to which the fourth spring 4 is connected. A direction of application of a force to the operating section 11 by the fourth spring 4 is parallel to a direction along which the operating section 11 is movable.

As in Embodiment 10, the operating section 11 is displaced between the first position and the second position according to an operating force, and the working section 12 is displaced between the third position and the fourth position. In the present embodiment, during return, the fourth spring 4 causes the operating section 11 to return from the second position to the first position, and the first spring 1, which has been elongated thereby, pulls the working section 12 so as to cause the working section 12 to return from the fourth position to the third position.

The third spring 3 acts at an oblique angle to the direction of motion of the working section 12. Therefore, the component, along the stroke axis S, of the restoring force of the third spring 3 acting on the working section 12 (i.e. the component in which the direction in which the working section 12 returns is positive) is smaller when the working section 12 is in the fourth position than in the third position, and monotonically decreases. Therefore, when the working section 12 starts to move from the third position to the fourth position, a repulsive force by the third spring 3 becomes gradually smaller. Therefore, when the working section 12 starts to move, the working section 12 is further accelerated. Further, during return, too, when the working section 12 starts to move from the fourth position to the third position, the working section 12 is accelerated by an increasing force component of the third spring 3 along the stroke axis S.

(FS Characteristic of the Return Mechanism 51)

(b) of FIG. 23 shows the force of the fourth spring 4 (fourth spring force), the force of the first spring 1 (first spring force), and the operating force. The operating force that is required for operation at each stroke position is the resultant of the first spring force and the fourth spring force. A positive force indicates that an upward force is being applied to the operating section 11 (in the direction from the second position to the first position). The working section 12 moves from the third position to the fourth position at the stroke S2 during operation, and the working section 12 moves from the fourth position to the third position at the stroke S1 during return.

For reference, (a) of FIG. 23 shows the configuration and FS characteristic of Reference Example 1. The return mechanism 100 of Reference Example 1 is one obtained by excluding the third spring 3 from the return mechanism 51 of the present embodiment. In Reference Example 1, when the accelerating spring force of the accelerating spring 111 acting on the working section 102 exceeds a retention force Fr by which the working section 12 is retained in the third position, the working section 12 moves to the fourth position. Further, during return, when the accelerating spring force of the accelerating spring 111 acting on the working section 102 exceeds a retention force Fr by which the working section 12 is retained in the fourth position, the working section 12 moves to the third position.

In the return mechanism 51, when the force of the first spring 1 acting on the working section 12 exceeds the sum of the retention force Fr by which the working section 12 is retained in the third position and a component $F1 \cdot \cos \eta 1$, along the stroke axis S, of the force of the third spring 3, the working section 12 moves to the fourth position. Note here that F1 is the restoring force of the third spring 3 in the third position. The position of the stroke S2 in the graph is to the right in comparison with Reference Example 1. Further, during return, when the force of the first spring 1 acting on the working section 12 exceeds the sum of the retention force Fr by which the working section 12 is retained in the fourth position and a component $F2 \cdot \cos \eta 2$, along the stroke axis S, of the force of the third spring 3, the working section 12 moves to the third position. Note here that F2 is the restoring force of the third spring 3 in the fourth position. The figure shows a case where $\eta 2 > 90°$, and the position of the stroke S1 in the graph is to the left in comparison with Reference Example 1. In a case where $\eta 2 < 90°$, the position of the stroke S1 in the graph is to the right in comparison with Reference Example 1. Note that $F1 \cdot \cos \eta 1 > F2 \cdot \cos \eta 2$. Therefore, in the return mechanism 51, the interval between the strokes S1 and S2 is larger than that of Reference Example 1.

Since the return mechanism 51 is one obtained by adding the third spring 3 to that of Reference Example 1, displacement of the working section 12 from the third position to the fourth position requires application of a larger operating force to the operating section 11. Further, as mentioned above, displacement of the working section 12 to the fourth position causes the component, along the stroke axis S, of the force of the third spring 3 to become smaller, assuming that the direction in which the working section 12 returns from the fourth position to the third position is positive. This makes it possible to increase elastic energy that is stored in the first spring 1 and released. This gives a high click rate and a satisfactory operational feeling. In FIG. 23, the shaded areas represent energy that is provided to the working section 12 during operation and return.

In the return mechanism 51 of the present embodiment, greater energy can be provided to the working section 12 than in Reference Example 1. That is, the working section 12 can be moved at a high speed. In a case where electric power is generated by a combination of the working section 12 of the return mechanism 51 and the aforementioned power-generating module, the amount of electric power that is generated can be made larger. Further, as in Embodiment 10, the return mechanism 51 can also be used in a switching arrangement.

Note that, as in the aforementioned embodiments, the return mechanisms 50 and 51 may be configured such that the operating section 11 and the working section 12 rotate. Note that such a second spring for use in return as that described in Embodiment 1 can also be added to the operating section 11 of each of the return mechanisms 50 and 51. Further, as in the aforementioned embodiments, any spring can be used. Further, the fifth spring 5 may be an elastic body (spring) contained in a power-generating element.

SUMMARY

In one aspect of the present invention, a return mechanism for an operating section and a working section includes: the operating section; the working section; a base; a first spring that acts between the operating section and the working section; and a second spring that acts between the operating section and the base, the operating section being moved from a first position to a second position by an external force and being moved from the second position to the first position by a force that is applied from the second position, the working section being moved between a third position and a fourth position in response to a motion of the operating section between the first position and the second position, the first spring causing the working section to be moved by elastic energy stored by at least either an external force that is applied to the operating section or the force that is applied from the second spring, the second spring causing the operating section to be returned to the first position by elastic energy stored by the external force that is applied to the operating section, in a case where the working section is in at least either the third position or the fourth position, a retention force that causes the working section to be retained in that position acting on the working section, a direction in which the force of the second spring is applied to the operating section when the operating section is in the first position being not parallel to a direction in which the force of the second spring is applied to the operating section when the operating section is in the second position, a component which, of the force of the second spring, acts in a direction of motion of the operating section being smaller when the operating section is in the second position than in the first position, assuming that a direction of return of the operating section is positive.

According to the foregoing configuration, for example in a case where the retention force acts in the third position, elastic energy is stored in the first spring and the second spring in response to a motion of the operating section from the first position to the second position. When an influence exerted by a restoring force of the first spring exceeds the retention force, the elastic energy stored in the first spring is released, so that the working section can be moved at a high speed regardless of the speed of operation. Similarly, in a case where the retention force acts in the fourth position, the working section can be moved at a high speed during return. Further, the direction in which the force of the second spring is applied changes according to a position of the operating section. This makes it possible to change, according to the direction in which the force of the second spring is applied, a component which, of a restoring force of the second spring, acts in the direction of motion of the operating section.

Note here that the second spring is provided to cause the operating section and the working section to return to the first position and the third position, respectively. According to the foregoing configuration, the component which, of the force of the second spring, acts in the direction of motion of the operating section is smaller when the operating section is in the second position than in the first position. This makes it possible to lower the maximum value of an external force that is required for operation of the operating section.

The return mechanism may be configured such that a direction of a force that the second spring applies to the operating section when the operating section is in the first position is at an oblique angle to a direction along which the operating section moves.

For example in a case where the operating section is translated, a force with which the second spring causes the operating section in the second position to return can be reduced, as the direction of the force that the second spring applies to the operating section is at an oblique angle to the direction along which the operating section moves.

The return mechanism may be configured such that: when the operating section is released from the external force, a resultant force of the first spring and the second spring causes the operating section to return from the second position to the first position; and a force of the first spring as generated by the return of the operating section causes the working section to return from the fourth position to the third position.

The return mechanism may be configured such that: the force that the second spring applies when the operating section is in the second position is larger than the force that the second spring applies when the operating section is in the first position; and assuming that θ is an angle between a direction in which an operating point of the operating section returns, the operating point being a point at which the second spring is connected to the operating section, and a direction in which the force of the second spring is applied to the operating section, |cos θ| is smaller when the operating section is in the second position than when the operating section is in the first position.

According to the foregoing configuration, the component which, of the force of the second spring, acts in the direction of motion of the operating section becomes smaller according to |cos θ|. This makes it possible to reduce the force with which the second spring causes the operating section in the second position to return.

The return mechanism may be configured such that during displacement of the operating section from the first position to the second position, the component which, of the force of the second spring, acts in the direction of motion of the operating section monotonically decreases.

According to the foregoing configuration, the force with which the second spring causes the operating section to return can be reduced as the operating section is displaced from the first position to the second position.

The second spring may be a torsion spring or a plate spring.

In one aspect of the present invention, a power generator may be configured to include: the return mechanism; a magnet; and a coil, て え power generator inducing a current in the coil by causing a magnetic flux of the magnet that passes through the coil to change in tandem with a motion of the working section.

In one aspect of the present invention, a switching arrangement may be configured to include: the return mechanism; and a transmitter, the transmitter transmitting a signal to an external device according to a position of the operating section.

In one aspect of the present invention, an acceleration mechanism for a working section, the acceleration mechanism comprising: an operating section; the working section; a base; a first spring that acts between the operating section and the working section; and a third spring that acts between the working section and the base, the operating section being moved from a first position to a second position by an external force, the working section being moved between a third position and a fourth position in response to a motion of the operating section between the first position and the second position, the first spring causing the working section to be moved by elastic energy stored by an external force that is applied to the operating section, in a case where the working section is in at least either the third position or the fourth position, a retention force that causes the working section to be retained in that position acting on the working section, a direction in which the force of the third spring is applied to the working section when the working section is in the third position being not parallel to a direction in which the force of the third spring is applied to the working section when the working section is in the fourth position, a component which, of the force of the third spring, acts in a direction of motion of the working section being smaller when the working section is in the fourth position than in the third position, assuming that a direction of return of the working section from the fourth position to the third position is positive.

According to the foregoing configuration, for example in a case where the retention force acts in the third position, elastic energy is stored in the first spring in response to a motion of the operating section from the first position to the second position. When an influence exerted by a restoring force of the first spring exceeds the sum of a component, along the direction of motion, of a restoring force of the third spring and the retention force, the elastic energy stored in the first spring is released, so that the working section can be moved at a high speed regardless of the speed of operation. Similarly, in a case where the retention force acts in the fourth position, the working section can be moved at a high speed during return. Further, the direction in which the force of the third spring is applied changes according to a position of the operating section. This makes it possible to change, according to the direction in which the force of the third spring is applied, the component which, of the restoring force of the third spring, acts in the direction of motion of the operating section.

According to the foregoing configuration, the component which, of the force of the third spring, acts in the direction of motion of the working section is smaller when the working section is in the fourth position than in the third position. This makes it possible to further accelerate the working section that has started to move.

The acceleration mechanism may further include a fourth spring that acts between the operating section and the base, wherein the fourth spring causes the operating section to be returned to the first position by elastic energy stored by the external force that is applied to the operating section.

The acceleration mechanism may further include a fifth spring that acts between the working section and the base, wherein the fifth spring causes the working section to be returned to the third position by elastic energy stored by a motion of the working section from the third position to the fourth position.

A direction of a force that the third spring applies to the working section when the working section is in the third position may be at an oblique angle to a direction along which the working section moves.

The acceleration mechanism may be configured such that assuming that $\theta$ is an angle between a direction in which a connection point of the working section returns, the connection point being a point at which the third spring is connected to the working section, and a direction in which the force of the third spring is applied to the working section, $\cos \theta$ is smaller when the working section is in the fourth position than when the working section is in the third position.

According to the foregoing configuration, the component which, of the force of the third spring, acts in the direction of motion of the working section becomes smaller according to $\cos \theta$. This makes it possible to accelerate a motion of the working section from the third position or a motion of the working section from the fourth position to the third position.

The acceleration mechanism may be configured such that during displacement of the working section from the third position to the fourth position, the component which, of the force of the third spring, acts in the direction of motion of the working section monotonically decreases, assuming that the direction of return of the working section from the fourth position to the third position is positive.

According to the foregoing configuration, the working section that has started to move can be further accelerated by the first spring, as a repulsive force by the third spring in response to a motion of the working section monotonically decreases.

The retention force may be a magnetic force.

The acceleration mechanism may be configured such that the working section may be configured to rotate from the third position to the fourth position.

The third spring may be a torsion spring or a plate spring.

In one aspect of the present invention, a switching arrangement includes: the acceleration mechanism; and a transmitter, the transmitter transmitting a signal to an external device according to a position of the operating section.

In one aspect of the present invention, a power generator includes: the acceleration mechanism; a magnet; and a coil, the power generator inducing a current in the coil by causing a magnetic flux of the magnet that passes through the coil to change in tandem with a motion of the working section.

In one aspect of the present invention, a transmitter includes the power generator, the transmitter transmitting a signal to an external device by using electric power generated by the power generator.

In one aspect of the present invention, a switching arrangement include the transmitter, the transmitter transmitting a signal to the external device according to a position of the operating section.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to a return mechanism, an acceleration mechanism, a power generator, a transmitter, and a switching arrangement.

REFERENCE SIGNS LIST

1 First spring
2 Second spring
3 Third spring
4 Fourth spring
5 Fifth spring
10, 30 to 36 Return mechanism
11 Operating section
11a Operating point
12 Working section
12a Working point
12e Connection point
13 Base
14 Plunger
21a, 21b Magnet
23a, 23b Adhesive body
24 Elastic body
40 Switching arrangement
41 Housing
42 Coil
43a, 43b Yoke
44 Magnet
45 Transmitter
50, 51 Return mechanism (acceleration mechanism)

The invention claimed is:
1. An acceleration mechanism for a working section, the acceleration mechanism comprising:
an operating section;
the working section;

a base;

a first spring that acts between the operating section and the working section; and a third spring that acts between the working section and the base, the operating section being moved from a first position to a second position by an external force, the working section being moved between a third position and a fourth position in response to a motion of the operating section between the first position and the second position, the first spring causing the working section to be moved by elastic energy stored by an external force that is applied to the operating section, in a case where the working section is in at least either the third position or the fourth position, a retention force that causes the working section to be retained in that position acting on the working section, a direction in which the force of the third spring is applied to the working section when the working section is in the third position being not parallel to a direction in which the force of the third spring is applied to the working section when the working section is in the fourth position, a component which, of the force of the third spring, acts in a direction of motion of the working section being smaller when the working section is in the fourth position than in the third position, wherein that a direction of return of the working section from the fourth position to the third position is positive.

2. The acceleration mechanisms as set forth in claim 1, further comprising a fourth spring that acts between the operating section and the base, wherein the fourth spring causes the operating section to be returned to the first position by elastic energy stored by the external force that is applied to the operating section.

3. The acceleration mechanisms as set forth in claim 1, further comprising a fifth spring that acts between the working section and the base, wherein the fifth spring causes the working section to be returned to the third position by elastic energy stored by a motion of the working section from the third position to the fourth position.

4. The acceleration mechanism as set forth in claim 1, wherein a direction of a force that the third spring applies to the working section when the working section is in the third position is at an oblique angle to a direction along which the working section moves.

5. The acceleration mechanism as set forth in claim 1, wherein that 0 is an angle between a direction in which a connection point of the working section returns, the connection point being a point at which the third spring is connected to the working section, and a direction in which the force of the third spring is applied to the working section, cos 0 is smaller when the working section is in the fourth position than when the working section is in the third position.

6. The acceleration mechanism as set forth in claim 1, wherein during displacement of the working section from the third position to the fourth position, the component which, of the force of the third spring, acts in the direction of motion of the working section monotonically decreases, wherein that the direction of return of the working section from the fourth position to the third position is positive.

7. The acceleration mechanism as set forth in claim 1, wherein the retention force is a magnetic force.

8. The acceleration mechanism as set forth in claim 1, wherein the working section rotates from the third position to the fourth position.

9. The acceleration mechanism as set forth in claim 1, wherein the third spring is a torsion spring or a plate spring.

* * * * *